(12) United States Patent
Luckevich et al.

(10) Patent No.: US 11,921,520 B2
(45) Date of Patent: Mar. 5, 2024

(54) DEVICES, SYSTEMS, AND METHODS FOR TRANSMITTING VEHICLE DATA

(71) Applicant: Peloton Technology, Inc., Mountain View, CA (US)

(72) Inventors: Mark S. Luckevich, San Jose, CA (US); Shad M. Laws, Palo Alto, CA (US); Joshua P. Switkes, Mountain View, CA (US); Trevor W. Laing, San Jose, CA (US); Joseph Jackson Bendor, San Mateo, CA (US)

(73) Assignee: Peloton Technology, Inc, Pacific Grove, CA (US)

( * ) Notice: Subject to any disclaimer, the term of this patent is extended or adjusted under 35 U.S.C. 154(b) by 0 days.

(21) Appl. No.: 17/744,574

(22) Filed: May 13, 2022

(65) Prior Publication Data

US 2023/0101708 A1 Mar. 30, 2023

Related U.S. Application Data

(60) Continuation of application No. 16/127,114, filed on Sep. 10, 2018, now Pat. No. 11,334,092, which is a
(Continued)

(51) Int. Cl.
| | |
|---|---|
| *G05D 1/02* | (2020.01) |
| *G01C 22/00* | (2006.01) |
| *G01S 13/931* | (2020.01) |
| *G05D 1/00* | (2006.01) |
| *G08G 1/00* | (2006.01) |
| *G08G 1/16* | (2006.01) |
| *G01C 23/00* | (2006.01) |

(Continued)

(52) U.S. Cl.
CPC .......... *G05D 1/0295* (2013.01); *G01C 22/00* (2013.01); *G01S 13/931* (2013.01); *G05D 1/0217* (2013.01); *G05D 1/0293* (2013.01); *G05D 1/0297* (2013.01); *G08G 1/166* (2013.01); *G08G 1/167* (2013.01); *G08G 1/202* (2013.01); *G08G 1/22* (2013.01); *G01C 23/00* (2013.01); *G01S 13/92* (2013.01); *G01S 13/93* (2013.01); *G01S 2013/9323* (2020.01); *G05D 2201/0213* (2013.01)

(58) Field of Classification Search
CPC .. G05D 1/0295; G05D 1/0217; G05D 1/0293; G05D 1/0297; G05D 2201/0213; G01C 22/00; G01S 13/931; G01S 13/92; G01S 13/93; G08G 1/166
See application file for complete search history.

(56) References Cited

U.S. PATENT DOCUMENTS

| | | | |
|---|---|---|---|
| 10,454,707 B2 * | 10/2019 | Nix | H04L 12/40169 |
| 2009/0030561 A1 * | 1/2009 | Gurieff | B60T 8/1755 701/1 |
| 2012/0140861 A1 * | 6/2012 | Menon | B60T 7/18 375/356 |

* cited by examiner

*Primary Examiner* — Edwin A Young
(74) *Attorney, Agent, or Firm* — Redbrick IP, P.C.

(57) ABSTRACT

Systems and methods for coordinating and controlling vehicles, for example heavy trucks, to follow closely behind each other, or linking to form a platoon. In one aspect, on-board controllers in each vehicle interact with vehicular sensors to monitor and control, for example, gear ratios on vehicles. A front vehicle can shift a gear which, via a vehicle-to-vehicle communication link, can cause a rear vehicle to shift gears. To maintain a gap, vehicles may shift gears at various relative positions based on a grade of a road.

20 Claims, 16 Drawing Sheets

Related U.S. Application Data continuation-in-part of application No. 16/010,368, filed on Jun. 15, 2018, now Pat. No. 10,520,952, which is a continuation-in-part of application No. 15/607,316, filed on May 26, 2017, now Pat. No. 10,281,927, which is a continuation of application No. 14/292,583, filed on May 30, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006.

(60) Provisional application No. 61/505,076, filed on Jul. 6, 2011.

(51) Int. Cl.
*G01S 13/92* (2006.01)
*G01S 13/93* (2020.01)

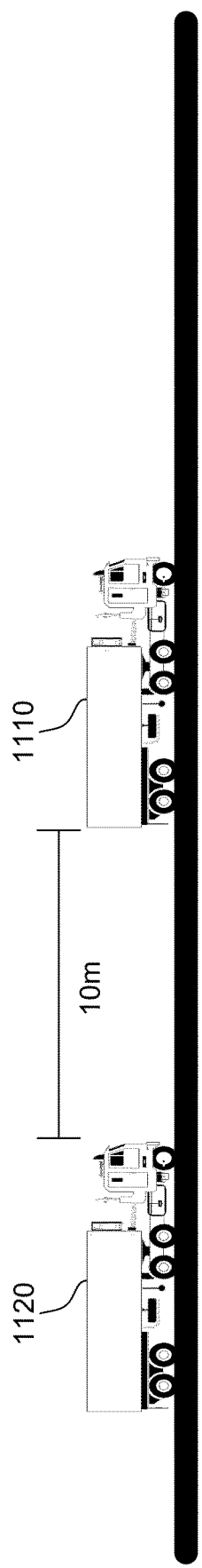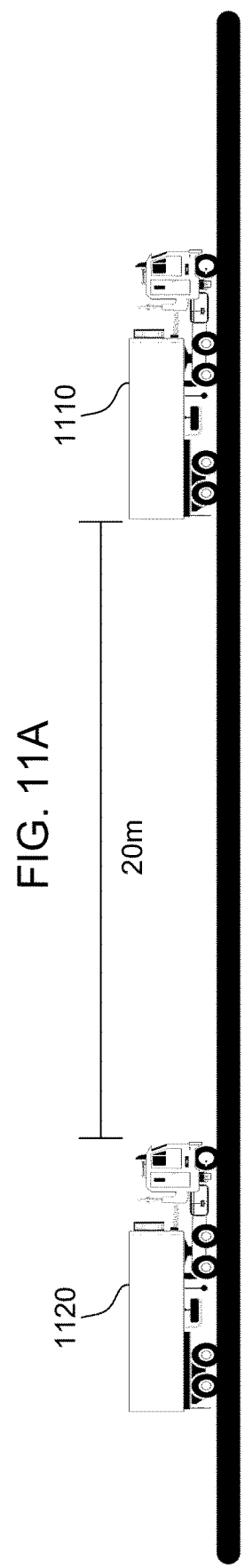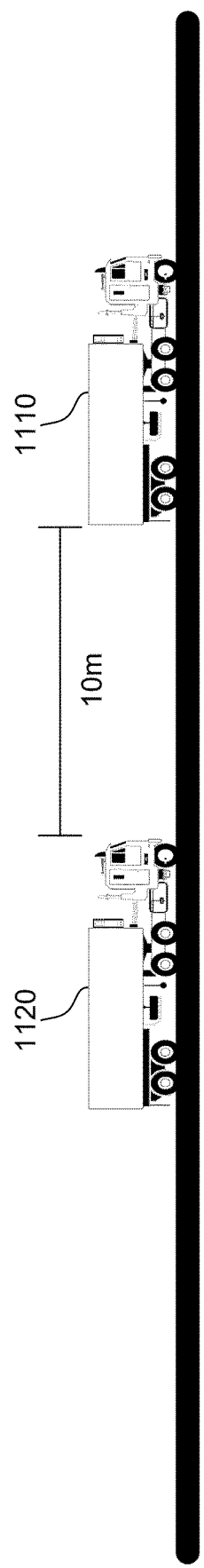

DEVICES, SYSTEMS, AND METHODS FOR TRANSMITTING VEHICLE DATA

CROSS-REFERENCE TO RELATED APPLICATIONS

This application is a continuation of Ser. No. 16/127,114, filed Sep. 10, 2018, which is a continuation in part of U.S. application Ser. No. 16/010,368, filed Jun. 15, 2018, which is a continuation in part of U.S. application Ser. No. 15/607,316, filed May 26, 2017, which is a continuation of U.S. application Ser. No. 14/292,583, filed May 30, 2014, now U.S. Pat. No. 9,665,102, which is a division of U.S. application Ser. No. 13/542,622, filed Jul. 5, 2012, now U.S. Pat. No. 8,744,666, all of which are entitled "Systems and Methods for Semi-Autonomous Vehicular Convoys" and are incorporated by reference herein in their entirety for all purposes. Additionally, U.S. application Ser. No. 13/542,622 claims the benefit of U.S. Provisional Application No. 61/505,076, filed on Jul. 6, 2011, which is entitled "Systems and Methods for Semi-Autonomous Vehicular Convoying" and is incorporated by reference herein in its entirety for all purposes.

Additionally, U.S. application Ser. No. 14/292,583 is a division of U.S. application Ser. No. 13/542,627, filed Jul. 5, 2012, now U.S. Pat. No. 9,582,006, entitled "Systems and Methods for Semi-Autonomous Convoying of Vehicles", which is incorporated by reference herein in its entirety for all purposes, and which in turn also claims the benefit of U.S. Provisional Application No. 61/505,076, filed on Jul. 6, 2011.

BACKGROUND

Controlling vehicles using vehicle-to-vehicle communication has been a challenging task for many decades now. While many enterprises have tried to create vehicles that can be controlled remotely, many have failed due to the complexity of the systems at play. While a toy car may not be difficult to assemble, building a large vehicle for use on public roads can be a daunting task. For example, vehicles may need to utilize some type of computer vision, such as camera, radar, or LIDAR, to prevent accidental collisions. In some systems, various vehicle dynamics come into play and a precise system must know the weight of a vehicle, a vehicle's wheelbase, a vehicle's suspension, etc.

Previous solutions to control vehicles have included drive-by-wire systems. A drive-by-wire system replaces a mechanical system in a car by electronically "connecting" major components. For example, an accelerator pedal that would normally have cables attached to it to control the throttle valve of an engine can be replaced with a pedal that is electronically connected to the throttle valve of an engine. Similarly, a brake by wire system could eliminate the need for hydraulics by using motors to actuate calipers, in comparison to the currently existing technology where a system provides braking effort by building hydraulic pressure in brake lines. With steering by wire, fewer mechanical components or linkages between the steering wheel and the wheels are utilized and replaced by electric motors which may be actuated by electronic control units (ECUs) monitoring steering wheel inputs.

While drive-by-wire systems work well in some environments, they are not always ideal for precision systems as required by vehicles that travel on public roads. For example, controlling a vehicle's speed using only an engine throttle and a caliper brake may not be ideal when precision acceleration or braking is required. Similarly, controlling the direction of a vehicle's wheels by moving a steering wheel (physically or remotely) may not be as precise as required by some applications—particularly at high speeds.

Thus, devices, methods, and systems described herein provide improvements in the art by being capable of controlling one or more vehicles, including a platoon of vehicles, more precisely than systems currently available in the art.

SUMMARY

The system and methods comprising various aspects of the disclosure described herein combine attributes of state of the art convenience, safety systems, and manual control to provide a safe, efficient convoying or platooning solution. For example, but without limitation, aspects of the present invention enable a method for maintaining a relationship between more than one vehicle. In such a method, a lead vehicle may provide data from its electronic control units (ECUs) (e.g., an engine ECU, a brake ECU, a retarder ECU, a transmission ECU) to a rear vehicle's platooning ECU. A platooning ECU may then augment the information it received from the lead vehicle based on: (1) differences between a target distance between the two vehicles and a current distance between the two vehicles, and (2) a time offset based at least on the distance between the two vehicles and the speed of the rear vehicle. (Of course, this augmentation could be performed at another location, such as the front vehicle's platooning ECU). The rear vehicle's platooning ECU may then provide the augmented data to other ECUs within the rear vehicle (e.g., an engine ECU, a brake ECU, a retarder ECU, a transmission ECU). After the data is provided to the rear vehicle's ECUs, the rear vehicle's ECUs may perform operations such as requesting additional torque from an engine or other powertrain system, or shifting gears at a transmission.

As another example, aspects of the present invention enable a method for communicating information associated with torque between two or more vehicles. Based on the torque data, a gap between two vehicles may be determined, maintained, or otherwise modified. The torque data may be provided by an ECU associated with an engine. Additionally, torque data can assist with controlling a speed, accelerating, and braking.

Systems described herein, without limitation, may include a platooning ECU capable of determining whether two vehicles may platoon, whether two vehicles are platooning, and/or whether two vehicles should stop platooning. Such information may be based on information provided by a lead vehicle, which may be produced by the lead vehicle's ECUs. The lead vehicle's ECU data may be sent wirelessly to one or more rear vehicles and include information related to torque, brake, a retarder, transmission, etc. One or more platooning ECUs may receive the lead vehicle's ECU data and/or modify it based on information associated with a current gap between one or more vehicles, a target/desired gap between one or more vehicles, and a time offset associated with the speeds and positions of one or more vehicles. The modified information may be sent by the platooning ECU to one or more ECUs in the rear vehicle. Based on the modified information received by the rear vehicle's ECUs, the rear vehicle's ECUs may perform the same, or substantially/effectively the same operations as some or all of the lead vehicle's ECUs.

It will be appreciated by those skilled in the art that the various features of the present disclosure can be practiced alone or in combination. These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which:

FIGS. 11A-11C illustrate vehicles travelling on flat terrain, in accordance with some embodiments;

DETAILED DESCRIPTION

Figure 1:
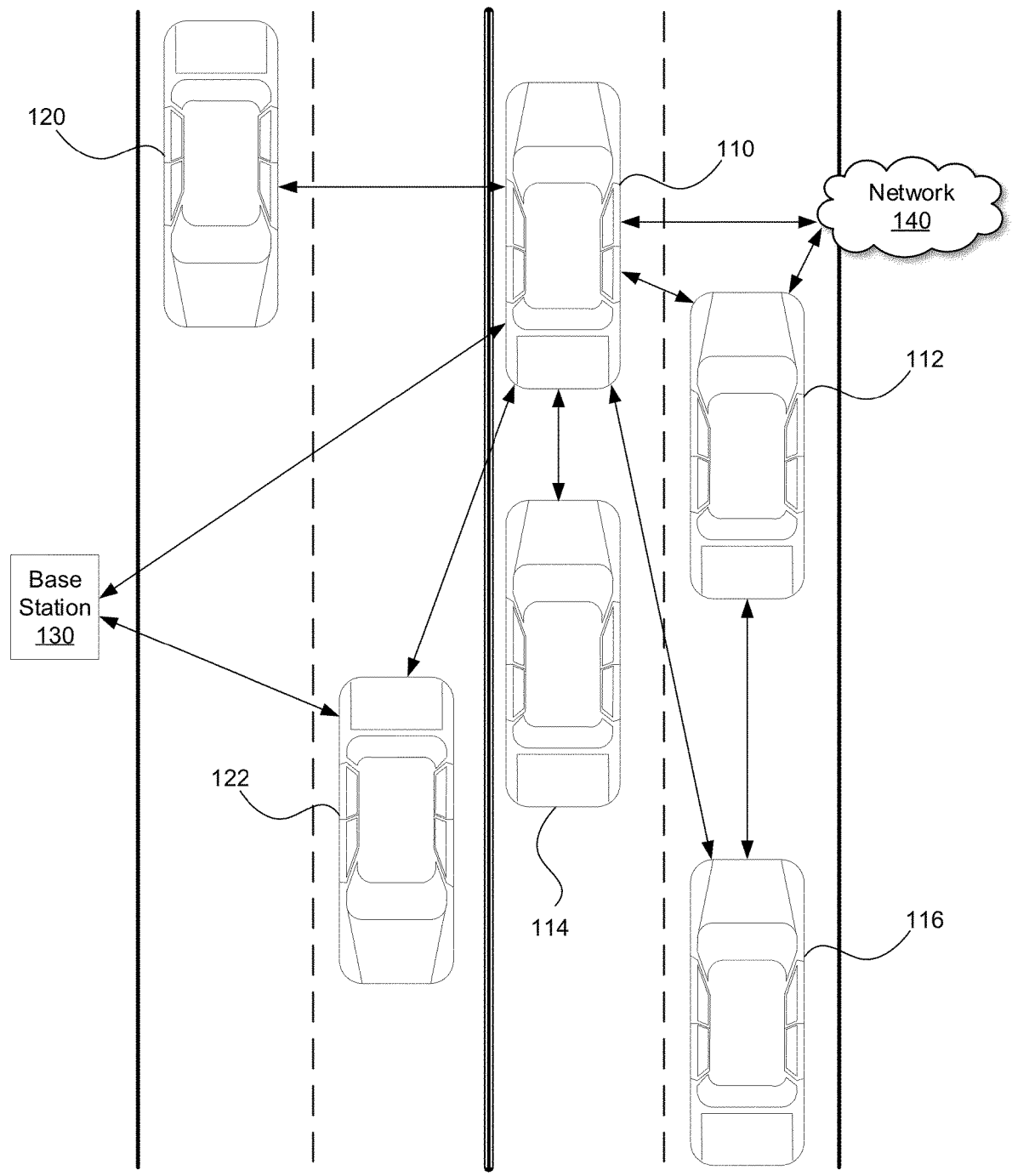
FIG. 1 illustrates a diagram of vehicles transmitting data, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein.

The Applicant has proposed various vehicle communication systems in which a second, and potentially additional, vehicle(s) is/are automatically, or semi-automatically controlled in response to receiving instructions from a first vehicle. By way of example, U.S. patent application Ser. Nos. 15/605,456, 15/607,902; 13/542,622 and 13/542,627; U.S. Provisional Patent Application Nos. 62/377,970 and 62/343,819; and PCT Application Nos. PCT/US2014/030770, PCT/US2016/049143 and PCT/US2016/060167 describe various vehicle systems in which a recipient vehicle is at least partially controlled by a provider vehicle (e.g., a recipient vehicle is a vehicle that receives data from a provider vehicle, but it should be understood that a recipient vehicle can send data to a provider vehicle). Some of these applications describe platooning, wherein at least one vehicle follows closely behind another. In such cases, a recipient vehicle may be referred to as a trailing vehicle and/or a rear vehicle, and a provider vehicle may be referred to as a lead vehicle and/or a front vehicle. Each of these earlier applications is incorporated herein by reference in their entirety.

One of the goals of platooning is typically to maintain a desired position between the platooning vehicles and/or a desired relative speed and/or time headway (e.g., a gap may refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (distance/headway), staying at a gap, and/or keeping at least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate.

For the purposes of this application, the subtle yet important difference between controlling and commanding should be understood. Herein, the term commanding may be used to signify an action where a device is ordered to do something, while controlling refers to device supervision and/or adjustment. For example, an engine may be commanded to provide 2,000 N·m as opposed to controlling, where an engine ensures 2,000 N·m is being provided while potentially taking other variables into account and adjusting as needed such that the engine is substantially (e.g., for the most part/about/close to) providing a particular amount of torque, which in this case would be substantially 2,000 N·m. Herein, if a system can command and/or control, either term may be used for the ease of reading.

In some embodiments described herein, a vehicle may essentially control some or all of the functions of another vehicle using V2V communications. Research in the field of V2V communications has increased in recent years. In some embodiments herein, a recipient vehicle controlled by a provider vehicle will receive data from the provider vehicle including drive-by-wire commands. For example, a provider vehicle may send data wirelessly to a recipient vehicle, wherein the sent data causes the recipient vehicle to apply a certain amount of throttle. As another example, a provider vehicle may send data to more than one vehicle (e.g., broadcast data), and such data may control vehicles. For example, one vehicle may provide data to more than one other vehicle causing the receiving vehicles to apply their brakes.

As discussed above, in some instances providing instructions to control a throttle pedal, brake pedal, or steering wheel may not provide a desired amount of precision. For example, in some cases controlling the location of a throttle pedal may be less precise than controlling an engine ECU such that the engine produces a certain amount of torque. Similarly, in some systems commanding an engine ECU, brake ECU, transmission ECU and/or retarder ECU may cause an amount of torque (e.g., engine gross torque, engine net torque, wheel torque) to be provided that is more precise than a system that merely controls the location of an accelerator pedal and a brake pedal. For example, a system controlling a truck traveling downhill may benefit by being able to control torque using an engine ECU, brake ECU, transmission ECU, and/or retarder ECU. Herein, it should be appreciated that a transmission ECU may refer to an ECU that monitors a transmission (e.g., monitors one or more aspects of a transmission), an ECU that causes gears to shift (also referred to as a shifting ECU), or an ECU that can at least do both.

Herein, as will be discussed below particularly with reference to FIGS. 8A and 8B, the term shifting may be used broadly. For example, shifting gears and/or a gear shift may refer to: choosing/changing to a particular gear, choosing/changing to a gear ratio (whether a fixed ratio or a ratio created using a continuous variable transmission (CVT), or another ratio using a different type of transmission such as a dual-clutch), choosing/changing a speed ratio, and/or downshifting (e.g., changing to a lower gear ratio, which may result in higher RPMs (rotations per minute (e.g., engine rotations per minute))). Further, in some examples shifting gears may refer to: activating a clutch (e.g., to change to neutral, and/or to control the slip of a torque converter clutch and/or pulsations of a motor), choosing/changing a mode of a torque converter (e.g., released, locked up), preparing the next gear meshed in a dual-clutch transmission (e.g., choosing/changing the pre-selection of a gear), etc. Thus, the term shifting may refer to a number of actions performed on/by a transmission.

Moreover, herein, the term torque is used broadly to mean any portion of a system that may affect the torque of a vehicle, unless explicitly stated otherwise. For instance, the term torque may be used to describe, at least: (1) engine gross torque, (2) engine net torque, (3) wheel torque from an engine, and (4) wheel torque from braking. Further, each of these may include gear/transmission/shifting information, and various types of torque may be combined (e.g., wheel torque from an engine and wheel torque from braking may be combined and referred to as wheel torque).

At a high level, torque is a rotational force. An engine's gross torque, as an example, is the twisting force that an engine can produce before parasitic losses from the drivetrain (although, in some embodiments, an engine's gross torque may be an amount of force applied by pistons to a drive shaft). An engine's net torque, for example, may be the definition used by SAE standards J1349 and J2723, and may be the torque from an engine, measured at the same location as the gross torque (e.g., after the flywheel), when the engine is equipped with some or all of the parts necessary for actual engine operation (e.g., when an engine is actually installed in a vehicle). An engine's torque is transmitted through a gearbox, where it is multiplied with a gear ratio of an engaged gear, and produces a gearbox torque. It should be understood that commanding/controlling torque, as described herein, can apply to electric vehicles, including electric vehicles that may employ multispeed gearing (e.g., a transmission capable of shifting gear ratios). Next, torque can be measured at a differential, which then sends torque in multiple directions to the wheels. In some embodiments various amounts of torque are actively directed to one or more wheels (e.g., commanding/controlling torque using a differential such as a limited-slip differential). The amount of torque directed to any particular wheel/set of wheels may be determined based on attributes of a vehicle such as weight, the balance of a load, brake attributes, etc. Rotational force on a wheel may be referred to as wheel torque (e.g., when torque from an engine, retarder, or foundation brake reaches a vehicle's wheel). Wheel torque from an engine typically forces a vehicle to move forward (or backward if in reverse), or accelerate or decelerate if already in motion. However, wheel torque from a brake (e.g., a foundation brake) dampens wheel torque from an engine, and thus provides torque in an opposite direction from the engine torque. Since torque is a sum of all the individual torques acting on an object (e.g., net torque), wheel torque may be a combination of engine torque, brake torque, and/or any other torques applied.

Thus, herein, the term torque can be used to describe, at least: (1) the gross torque of an engine (e.g., the torque an engine can produce before loss from the drivetrain), (2) the net torque of an engine (e.g., the torque of an engine as it would be when installed in a vehicle including stock ignition timing, fuel delivery, exhaust systems, and accessories), (3) wheel torque (e.g., from an engine, from braking, a combination of the two), and (4) any of the torques described above with or without gear/shifting information (e.g., torque multiplied by a gear ratio or an amount of change of torque when a gear ratio changes).

In some embodiments, commanding/controlling torque may assist with platooning. When platooning, one goal is to maintain a desired position between vehicles. This position may be based on time and/or distance (e.g., time headway, distance headway). Dissolving a platoon may comprise commanding/controlling torque, ending a platoon, and/or causing a gap between vehicles to increase such that they are traveling at a safe distance.

In some embodiments, a gap is maintained by using vehicle-to-vehicle (V2V) communications to transmit information from a lead vehicle to a rear vehicle. This information may include radar information indicating the current gap between two vehicles, along with information indicating the speed of the lead vehicle. With this information, along with a target gap, a rear vehicle can apply throttle or brakes such that the current gap is equal to the target gap.

Similarly, in some embodiments a rear vehicle may receive steering and speed information from a lead vehicle. Steering information may include a current direction, a target direction, and/or a speed at which steering is changing (e.g., 0.5 degrees/second). With this information, along with current gap and speed information, a rear vehicle can steer such that it begins changing direction in the same direction and at the same location that the lead vehicle changed direction.

Better yet, in some more advanced embodiments, instead of controlling a throttle and brake to maintain a gap, a rear vehicle may provide information to its electronic control units (ECUs) to ensure that the current gap is equal to the target gap. For example, a platoon electronic control unit (platoon ECU, PECU, or platoon system) may provide input to one or more of a brake ECU, an engine ECU, a retarder ECU, a transmission ECU, and a chassis ECU to control a gap better than by controlling a throttle and brake. In some embodiments, a chassis ECU may control and/or monitor other ECUs such as an engine ECU, a brake ECU, etc.

Here, and as described in various embodiments herein, even more control can be gained by obtaining additional information from the lead vehicle's ECUs to provide more precise instructions to the rear vehicle's ECUs.

In current systems, only a limited amount of information is distributed over Controller Area Network (CAN) busses for ECU communication. In most commercial vehicles, the SAE J1939 protocol is used to transmit information using the CAN bus as the physical layer. Information that is not required to operate a vehicle is generally not sent out onto a CAN bus because vehicles are constantly transmitting other information between ECUs as required to operate the vehicle. CAN busses are often inundated with data/traffic associated with oxygen levels, emission controls, temperatures, throttle position sensors, camshaft position sensors, etc. Thus, in some embodiments described herein, in response to one method of transmitting information (e.g., from a bus to another vehicle and/or from one ECU to another ECU within the same vehicle) becoming congested and/or slowing down, data/traffic may be moved to another bus and/or data/traffic may be arbitrated (e.g., given priority over other data/traffic) to determine when, where, and/or which various data/traffic should be sent. Such an arbitrator may base its determinations on attributes of one or more provider or recipient vehicles, such as its engine or brakes. In addition, in some embodiments, it is contemplated that other protocols may be implemented such as CAN FD (flexible data-rate), which may overcome some traditional limitations of the CAN protocol.

Regardless of what protocol to transfer information is implemented, as described above, a rear vehicle following a lead vehicle may control a gap—and generally perform better—when it is able to obtain as much relevant data as possible from ECUs in the lead vehicle. For example, if the rear vehicle were able to receive more information from ECUs in a lead vehicle than the ECUs in a lead vehicle typically transmit over a CAN bus, a rear vehicle's platooning system could cause the ECUs in the rear vehicle to mimic the ECUs in the lead vehicle and thus platoon with greater accuracy.

For example, an average vehicle's CAN bus is very crowded when sending data between an engine ECU and other components. However, if a platooning system were able to gather additional data from a lead vehicle's engine ECU, brake ECU, transmission ECU, and retarder ECU, and send that data to a rear vehicle's engine ECU, brake ECU, transmission ECU, and retarder ECU, then the rear vehicle could react quicker and more precisely than current platooning systems as described above. In addition, such a technique could save fuel since the platoon ECU would be controlling throttle management using a feed forward model (e.g., this type of system would be predictive). In other words, techniques described herein may assist in preventing a vehicle from over-shooting a target gap, and then needing to readjust to achieve the target gap.

In some embodiments, to operate correctly, the ECUs on the lead vehicle and the rear vehicle should not perform the same operations at the same time. For example, if a lead vehicle's engine ECU commands more torque in response to grade increase (e.g., an incline), the rear vehicle's engine ECU may need to wait until it reaches that grade increase before it commands the additional torque. Thus, a platoon ECU may require a time offset which causes operations in the rear vehicle to occur at a different time than those operations in the lead vehicle.

Moreover, in some embodiments, the transmission ECUs on a lead vehicle and a trailing vehicle may need to act in concert. For example, transmission ECUs on a lead vehicle may detect/cause a change in gears which in turn may send a signal indicating that a transmission ECU on a rear vehicle should cause the rear vehicle's transmission to change gears. As discussed above, it should be understood that herein a transmission ECU may refer to an ECU that monitors a transmission (or a portion thereof), causes a transmission to shift gears (also referred to as a shifting ECU), or at least both. Herein, the term shifting is defined broadly, and may include shifting gears, a gear shift, choosing/changing a gear, choosing/changing a gear ratio (e.g., with a fixed gear ratio and/or a continuously variable transmission (CVT)), choosing/changing a speed ratio, and/or downshifting (e.g., changing to a lower gear ratio, which may result in higher RPMs), etc. Further, in some examples shifting gears may refer to: activating a clutch (e.g., to change to neutral, and/or to control the slip of a torque converter clutch and/or pulsations of a motor), choosing/changing a mode of a torque converter (e.g., released, locked up), the next gear meshed in a dual-clutch transmission (e.g., choosing/changing the pre-selection of a gear), etc. Additional discussion associated with transmissions, transmission ECUs, and timing gear shifting of one or more transmissions in one or more vehicles is discussed throughout the present disclosure, including at least with reference to FIGS. 10A-15.

Thus, in various embodiments, a platoon ECU can (1) receive information (which may not otherwise typically be available) from a lead vehicle's ECUs, (2) apply a time offset to prevent the rear vehicle from performing the same operations as the lead vehicle too soon or too late, (3) determine a difference between a target gap and a current gap, and (4) send output to the rear vehicle's ECUs such that they mimic the lead vehicle's ECUs while accounting for maintaining a gap and applying a correct time offset. It should be appreciated that step (2) may be performed at either vehicles, in various embodiments.

In various embodiments, a platoon ECU may need to account for other variables. For example, if a rear vehicle is heavier or lighter than a lead vehicle, then the platoon ECU will need to account for the difference in weight. In such a case, for example, the platoon ECU may only command the rear engine ECU to ramp up from 25% of its maximum torque to 30% of its maximum torque, even though the lead truck's engine ECU ramped up from 30% of its maximum torque to 40% of its maximum torque.

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

Figure 2:
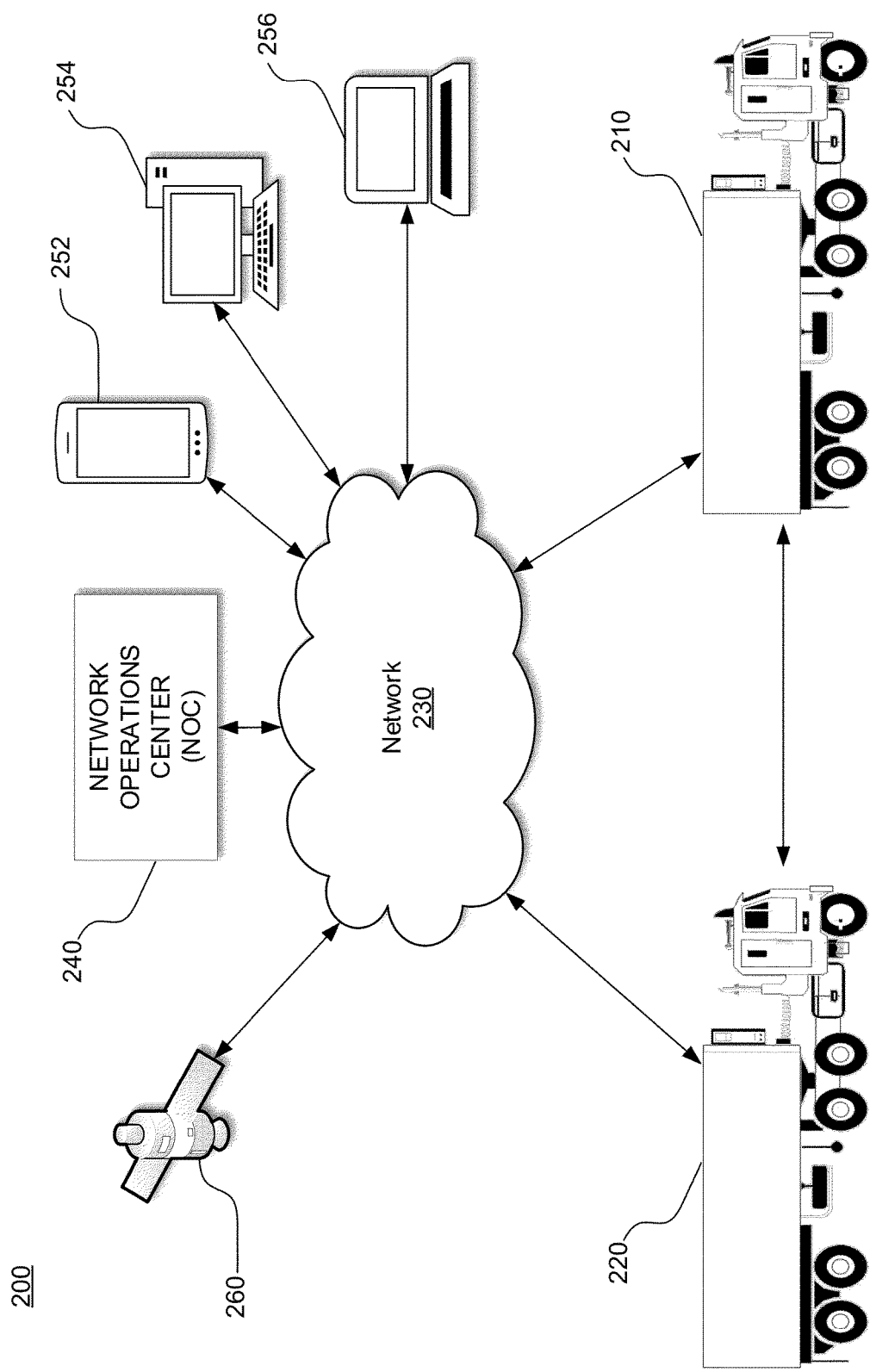
FIG. 2 illustrates a diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE*-Direct, 5G, a Citizen's Band (CB) Radio channel, one or more General Mobile Radio Service (GMRS) bands, one or more Family Radio Service (FRS) bands, Wi-Fi, Zigbee*- and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps*- or another online map provider, a traffic provider, a weather provider, etc.). Client devices can be used to view attributes of vehicles 210 and 220 such as their location, an estimate of their weight, their speed, an amount of engine torque, amount of applied brake, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States' Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
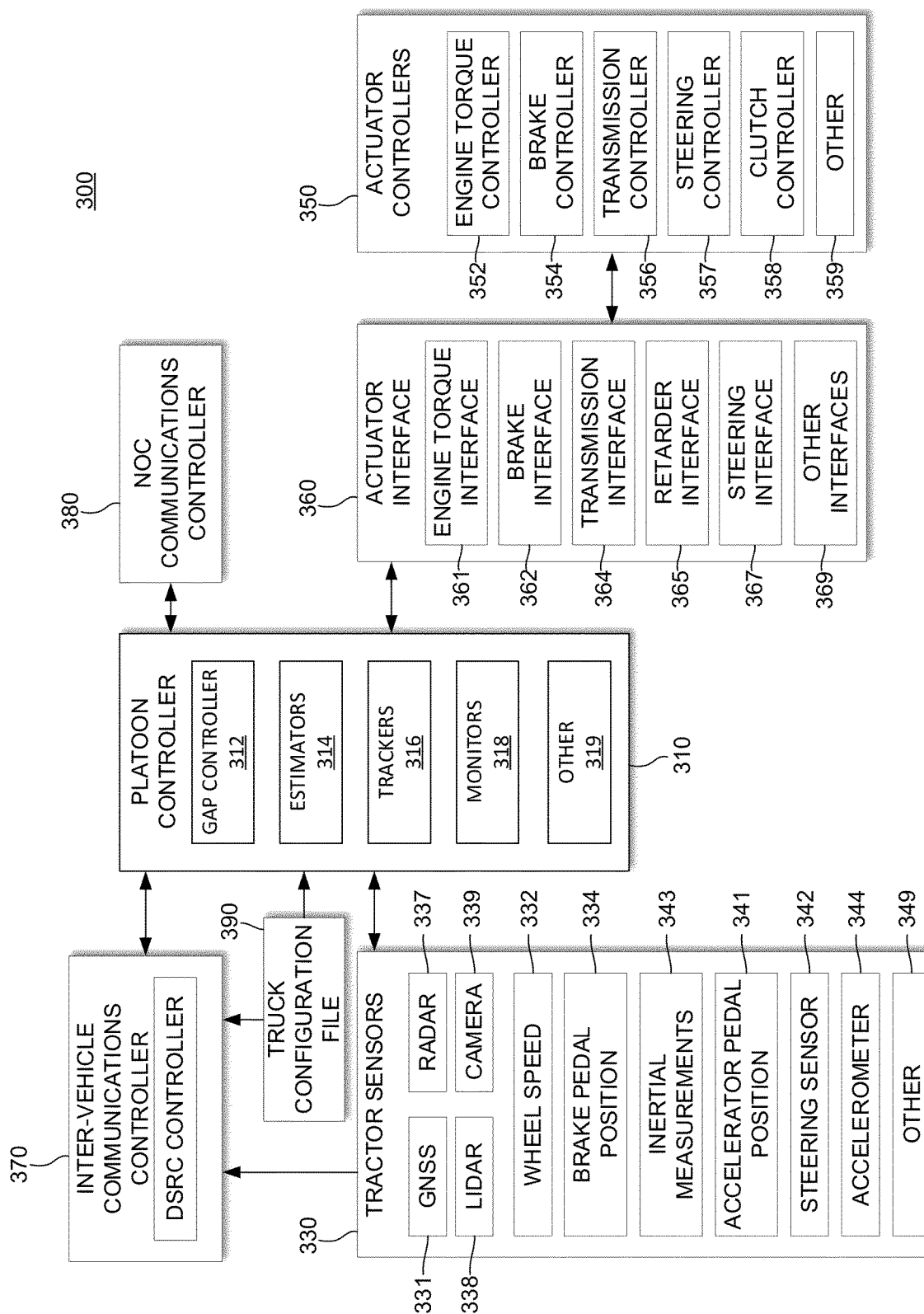
FIG. 3 illustrates a block diagram of a platooning system, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—which may obviate the need for a retarder ECU).

Large trucks and other heavy vehicles (e.g., class 8 vehicles) frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). ECUs will be described in further detail with regard to FIGS. 4 and 5. It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—obviating the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382.

They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms— as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

Figure 4:
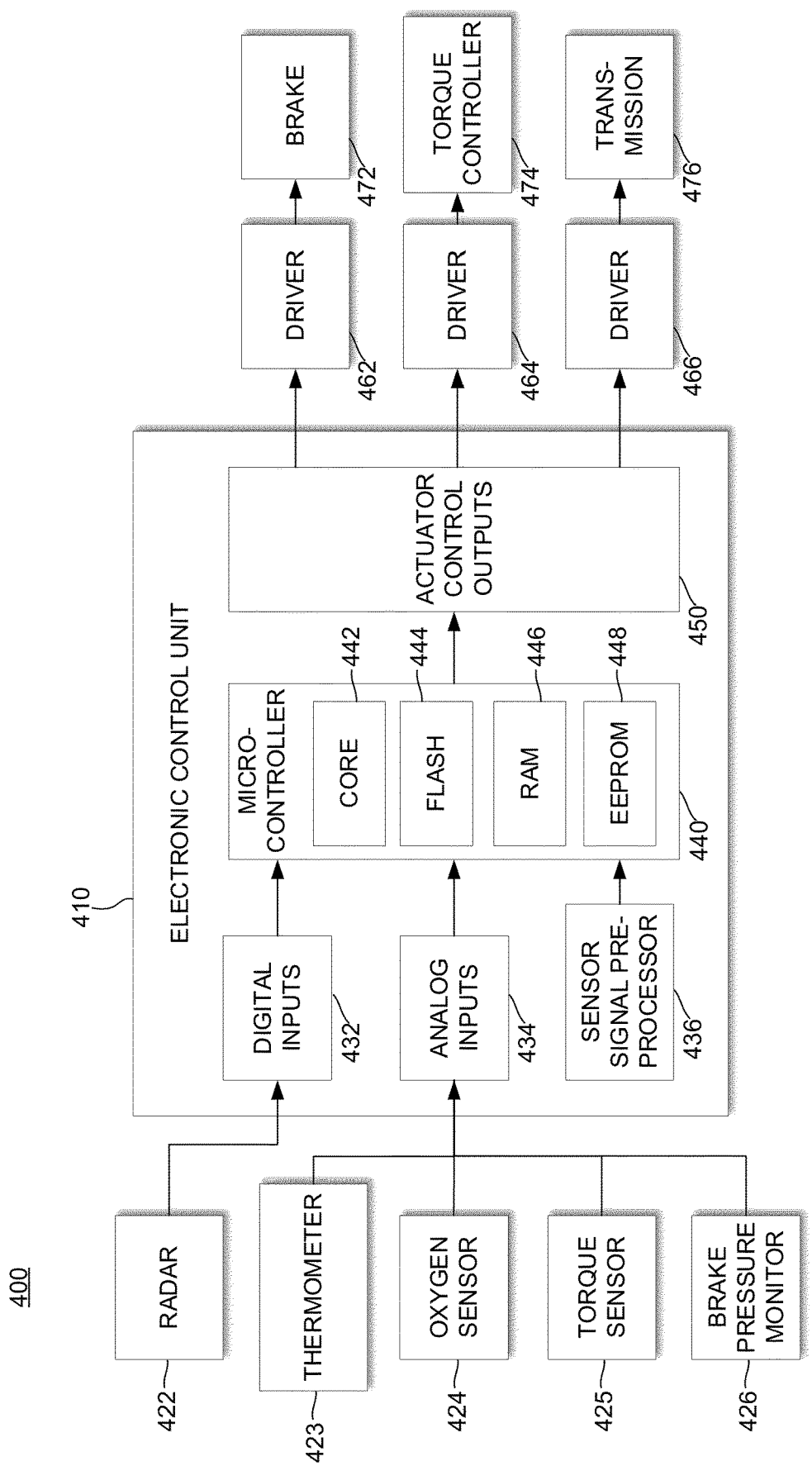
FIG. 4 illustrates a block diagram of a system including an electronic control unit, in accordance with some embodiments.

Continuing on to FIG. 4, a system 400 comprising an example ECU 410 is illustrated. An ECU may be any embedded system in a vehicle that controls one or more of the electrical/electromechanical systems or subsystems associated with a vehicle. For instance, an ECU can control aspects of an engine, transmission, braking system, etc.

ECU 410 may be use a closed-loop control, wherein ECU 410 monitors the output of a system to control the inputs to a system (e.g., managing the emissions and fuel economy of an engine). ECU 410 may gather data from dozens of different sensors including coolant temperature and an amount of oxygen in the exhaust. With such data, ECU 410 can perform millions of calculations per second, including looking up values in tables, and calculating the results of equations to determine the optimal spark timing and determining how long a fuel injector should remain open. Thus, ECU 410 can cause an engine to produce low emissions while saving fuel.

Some of the key elements of an ECU are shown in system 400. ECU 410 may have one or more modules to receive digital inputs 432 and/or analog inputs 434. In some embodiments ECU 410 may include a sensor signal preprocessor 436 to prepare signals for processing. In system 400, example devices are shown which provide input such as radar 432, thermometer 423, oxygen sensor 424, torque sensor 425, and brake pressure monitor 426. It should be well understood that these inputs are merely examples, as some ECUs may be specific to engine monitoring and/or controlling/commanding, brake monitoring and/or controlling/commanding, battery monitoring and/or controlling/commanding, etc.

Further, various components of a vehicle may share an ECU, or may utilize more than one ECU. For example, an engine ECU may control an engine and a retarder. As another example, a transmission may have two ECUs (e.g., one for monitoring a status of the transmission and a second for causing the transmission to shift gears).

Example ECU 410 comprises a microcontroller 440. ECU 410 may include more than one microcontroller. In some embodiments, microcontroller 440 may include on-board flash memory 444, random access memory (RAM) 446, electrically erasable programmable read-only memory (EEPROM) 448, and one or more cores 442. Of course, there are a wide variety of ECUs, and various components (e.g., various types of memory) may not be located on-board microcontroller 440.

In some embodiments, ECU 410 may include actuator control outputs 450, which may send signals to various drivers 462, 464, and 466. Drivers 462, 464, and 466 may in turn cause brake 472, torque controller 474, and/or transmission 476 to operate. Of course, it should be understood that various ECUs may simply monitor components and send information gathered from the components via a wired or wireless signal. A wireless signal generator may be included within, or external to an ECU. Thus, ECUs can monitor devices, send signals to operate devices, or do both.

Figure 5:
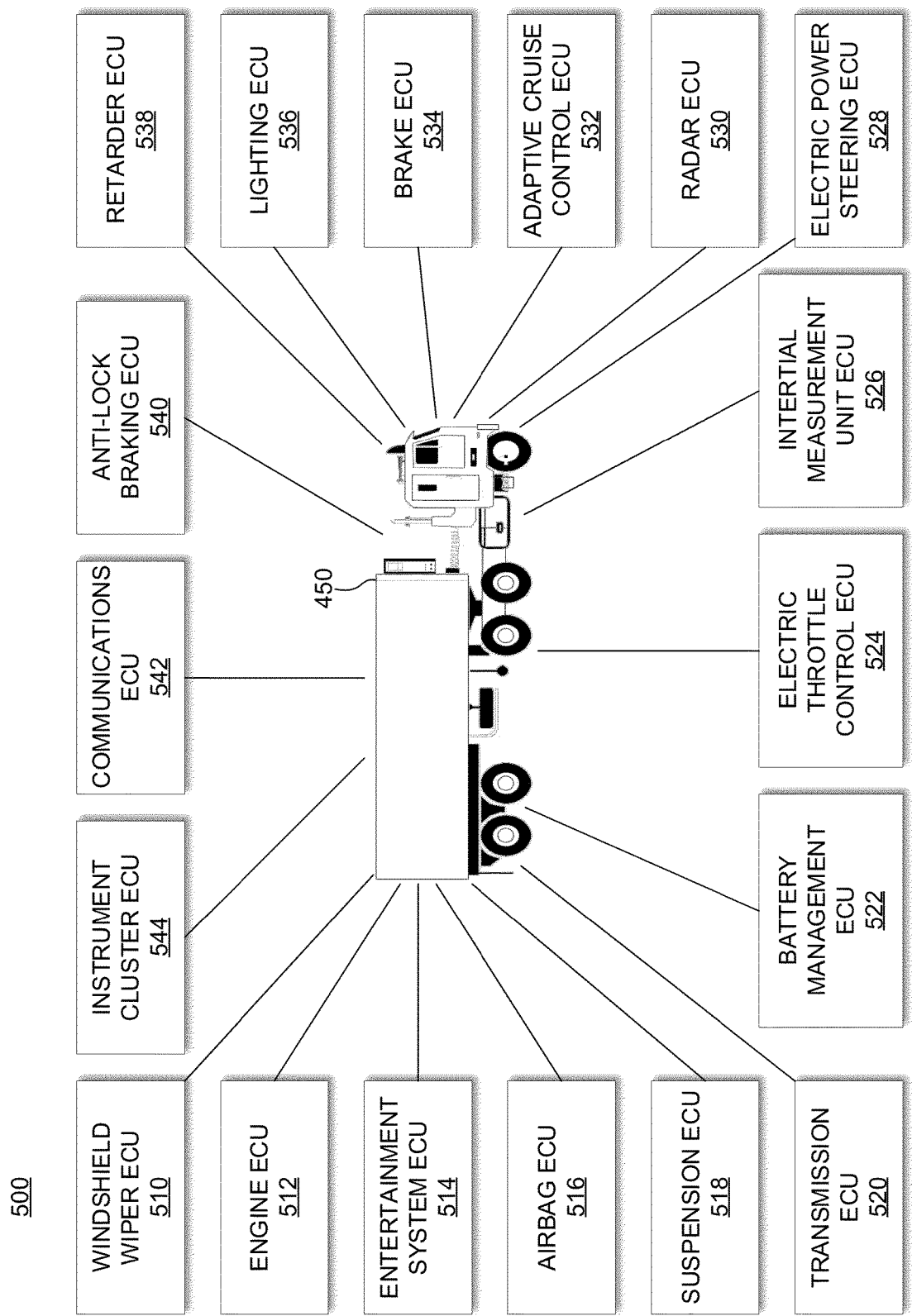
FIG. 5 illustrates a block diagram of a vehicle and its electronic control units, in accordance with some embodiments.

FIG. 5 illustrates a system 500 including example vehicle 550 and various ECUs included in vehicle 550. This illustration is intended to provide the reader with an idea of how many and what types of ECUs may be included in a modern vehicle. Many, if not all of these ECUs, may be controlled in part or fully be another vehicle, a NOC, or other devices.

Today, the number of ECUs in a vehicle may be anywhere from a few dozen to more than a few hundred. Examples shown in FIG. 5 include a windshield wiper ECU 510, which may include functionality to detect rain and/or operate windshield wipers. An engine ECU 512 (traditionally referred to as an Engine Control Unit) may control/command various aspects of an engine. It should be understood that "Engine Control Units" are occasionally referred to as ECUs, and for the purposes of this disclosure Engine Control Units will be referred to as Engine ECUs, or EECUs. System 500 also includes entertainment system ECU 514 which may control speaker(s), user interface(s), and/or display(s). An airbag ECU 516 may be included in some vehicles 550 for added safety in response to a collision. In some embodiments, suspension ECU 518 may be used to control the height of vehicle 550 and/or calculate an estimated weight of vehicle 550.

FIG. 5 also illustrates a transmission ECU 520. In various embodiments, transmission ECU 520 may take input from engine sensors, automatic transmission sensors, and from other ECUs to determine when and how to shift. Inputs to transmission ECU 520 may include, but are not limited to: a vehicle speed sensor, a wheel speed sensor, a throttle position sensor, a turbine speed sensor, a kick down switch, a brake light switch, a traction control system, hydraulic switches, and a cruise control module. Transmission ECU 520 may output signals to control shift solenoids, lock a selector via a shiftlock solenoid, control hydraulic or pneumatic pressure using pressure to control solenoids (to prevent too high a pressure which results in rough shifting, or too low a pressure which may cause a clutch to overheat), a torque converter solenoid (to regulate the torque converter electronically—once fully locked a torque converter no longer applies torque multiplication and will spin at the same speed as the engine, providing an increase in fuel economy), and other ECUs.

Other ECUs included in system 500 include a battery management ECU 522. Battery management ECU 522 may be used to control an amount of power going to an inverter, a motor, or other electrical devices based upon whether a vehicle is platooning. Another type of ECU is an electric throttle control ECU 524, which may electronically connect an accelerator to a throttle, replacing a mechanical linkage. An inertial measurement unit ECU 526 (also referred to as an IMU) may provide information such as a vehicle's current movement status to all requesting devices. This may include a linear and angular motion and/or position derived from gyroscopes and/or accelerometers.

FIG. 5 also includes an electronic power steering ECU 528 to make steering more comfortable. Also, vehicle 550 may include a radar ECU 530, which may be part of an Advanced Driver-Assistance System (ADAS) ECU and/or in compliance with ISO 26262. Another ECU included in example vehicle 550 includes an adaptive cruise control ECU, which may use a speed of vehicle 550, a time headway (e.g., an amount of time/distance assigned by a user), and a gap between a lead vehicle and vehicle 550 as inputs.

FIG. 5 also includes a brake ECU, which may monitor hydraulic pressure, brake pedal location, brake wear, and other attributes of brakes. In some embodiments, an anti-lock brake ECU 540 may be included in addition to, or as part of brake ECU 534. Anti-lock braking ECU 540 may receive inputs such as wheel speed sensors, radar, lidar, other gap measurement instrument, and other brake attributes, and include outputs such as actuators that control brakes, modulator valves, etc.

Also included in FIG. 5 is a lighting ECU 536 which may control interior and/or exterior lighting. In some embodiments lighting ECU 536 may control lights that indicate vehicle 450 is platooning. A retarder ECU 538 is also included in FIG. 5. Retarder ECU 538 may work in conjunction with brake ECU 534, engine ECU 512, transmission ECU 520, an IMU (e.g., Internal Measurement Unit ECU 526), and/or other ECUs to monitor vehicle conditions such as speed and relative angle, and, in some embodiments, to control a hydraulic or electric retarder.

Additionally, vehicle 550 may also include a communications ECU 542 which may receive and/or transmit various wired or wireless signals such as GPS information, DSRC packets, CB radio transmissions, etc. Further, vehicle 550 may include an instrument cluster ECU 544 which may receive inputs such as buttons that are pressed on an interface. Such a button may cause operations associated with platooning to occur, such as, but not limited to: initiating a platoon, dissolving a platoon, a brightness of a monitor associated with a platooning system, a volume of a speaker system associated with a platooning system, etc.

It is contemplated that in some embodiments a chassis ECU may be included in vehicle 550. A chassis ECU may monitor and control some or all sensors, actuators, and/or other devices in a vehicle, requiring fewer ECUs to perform a same amount of operations.

Figure 6:
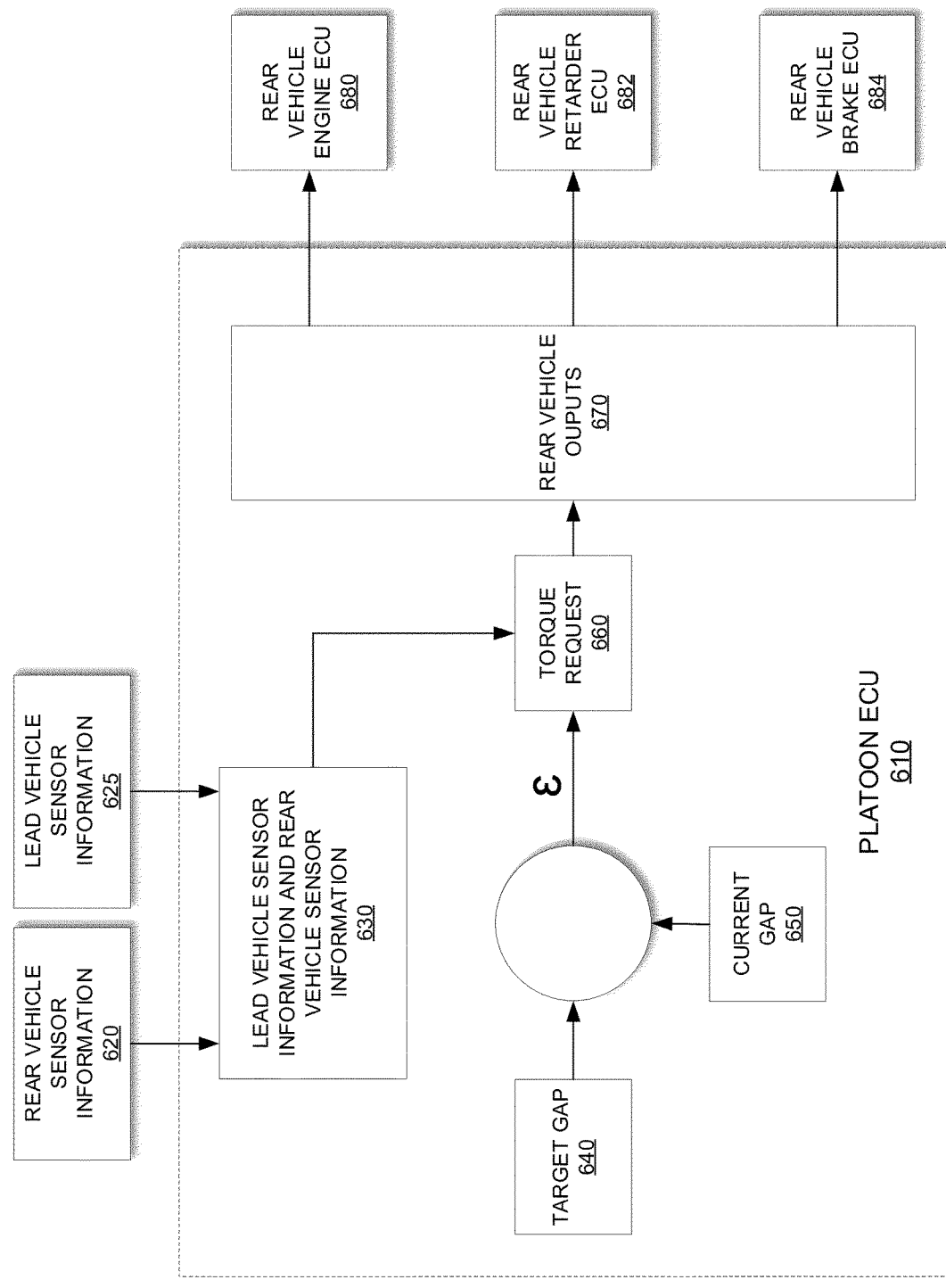
FIG. 6 illustrates a block diagram of a platooning system, in accordance with some embodiments.

Moving on to FIG. 6, an example system 600 for requesting torque from a rear vehicle (e.g., vehicle 220 of FIG. 2) is shown. In example system 600, rear vehicle sensor information 620 is combined with lead vehicle sensor information 625 to create lead vehicle sensor information and rear vehicle sensor information 630. In some embodiments, combining the two sets of information may occur in a platoon ECU 610. However, it should be appreciated that some or all of the components shown in platoon ECU 610 may be located external to platoon ECU 610. This information can be used to assist in creating/maintaining a gap between two vehicles (e.g., a target gap, a minimum gap, a maximum gap, a threshold gap), which can also be determined in platoon ECU 610 in some embodiments. The gap between two vehicles can be a distance between one or more portions of a lead vehicle (e.g., vehicle 210 from FIG. 2) and one or more portions of a rear vehicle. For example, as described above, a gap may be the distance between the front of a rear vehicle and the rear of a lead vehicle. Of course, as described above, a gap may be based on time (e.g., time headway). Herein the term gap may refer to either and be used interchangeably.

To determine a gap, information is typically already transmitted on the CAN bus, and based on that information estimates are made. In various embodiments, rear vehicle sensor information may include data received from one or more sensors that may be used to determine a gap between a lead vehicle and a rear vehicle. Such sensors may include ultrasonic sensor(s), radar(s), and/or LIDAR(s) (e.g., mechanical-mirror, 3D flash, optical phase array, and/or solid-state). Other information that can be obtained from the lead and rear vehicles includes, but is not limited to: wheel speed(s), whether brakes are in use, current speed, current engine torque, etc.

As shown in example system 600, a calculation is performed to determine the difference between target gap 640 and current gap 650. For example, a calculation may include subtracting a target gap from a current gap, and producing an error (c). This error may be greater or less than target gap 640. For example, the error may be substantially 1 meter, 5 meters, 10 meters, etc.

After a difference (e.g., c) is determined, lead vehicle sensor information 625 and rear vehicle sensor information 620 may be used, in combination with the difference, to create a torque request 660. Once a torque request is determined, it may be provided (e.g., via rear vehicle output module 670) to various ECUs such as rear vehicle engine ECU 680, rear vehicle retarder ECU 682, and/or rear vehicle brake ECU 684. Either one or more of these ECUs, and/or other ECUs, may cause the rear vehicle to either speed up or slow down such that the current gap 650 is closer to, or substantially equal to (e.g., within 1, 2, or 3 meters), target gap 640.

Figure 7:
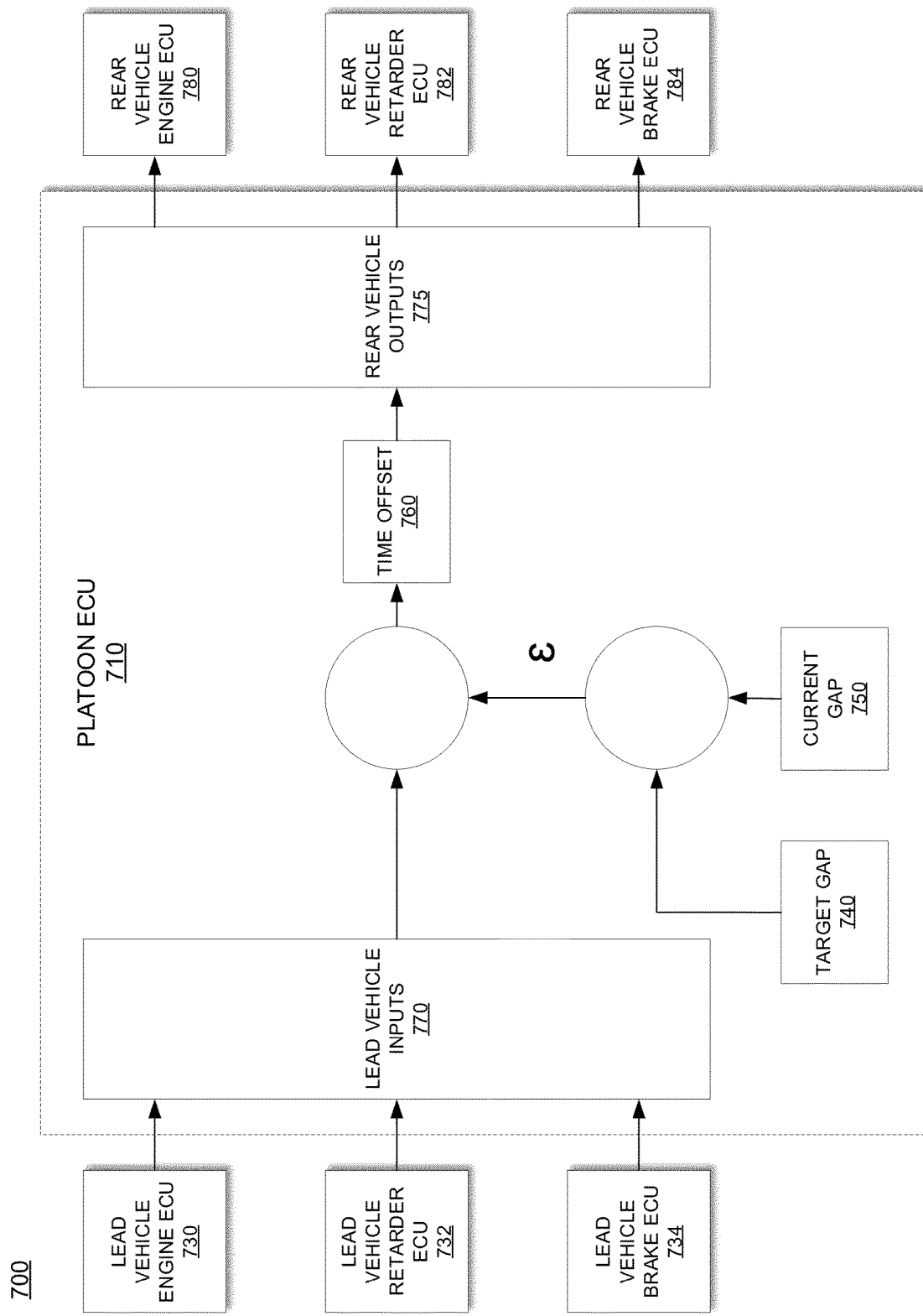
FIG. 7 illustrates a block diagram of a platooning system, in accordance with some embodiments.

FIG. 7 illustrates an example system 700. System 700 is similar to system 600 in that it provides input to the ECUs (e.g., actuator controllers) of a rear vehicle. However, system 700 determines the inputs to the ECUs differently than in system 700.

System 700 includes inputs from a lead vehicle engine ECU 780, a lead vehicle retarder ECU 782, and a lead vehicle brake ECU 784. Of course, more, or fewer, ECUs may provide input to system 700. These inputs 770 may then be digitally transferred to a rear vehicle where they are processed by platoon ECU 710. As with system 600, it should be appreciated that some, all, or none of the example components shown in platoon ECU 710 may be located within platoon ECU 710, and that some, all, or none of the example components shown in platoon ECU 710 may be external to platoon ECU 710.

By communicating the operations performed by individual ECUs from a lead vehicle's ECUs to a rear vehicle's ECUs—as opposed to communicating general information from a lead vehicle to a rear vehicle—at least some of the operations performed by the rear vehicle's ECUs will be much more precise and timely than the operations performed by the rear vehicle's ECUs when using example system 700 as opposed to a system such as example system 600 as described in FIG. 6.

To facilitate ECU to ECU transmission of information, in addition to information about a difference between target gap 740 and current gap 750, information about the time difference between a lead vehicle and a rear vehicle must be factored into calculations before being transmitted to the rear vehicle ECUs. For example, if a first truck starts going up a hill and its engine torque changes and/or its transmission changes gears, then the rear truck will change its engine torque and/or change its transmission's gears a short time after the lead truck performs these operations in order to: (1) account for c, and/or (2) account for the delay in time before the rear truck reaches the former location of the lead truck when the lead truck performed the operations. In some embodiments, a rear vehicle may be able to command an increase in torque in at least one of two ways: (1) a vehicle may command an exact amount of torque (e.g., a request may be sent to an engine ECU for 2,000 N·m and the engine will supply 2,000 N·m); or (2) a vehicle may request an amount of torque from an engine, and the engine may ramp up and then ramp down to the amount of torque requested (e.g., a request may be sent to an engine ECU for 2,000 N·m and the engine will "ramp up" and provide more than 2,000 N·m, and then ramp back down until it only provides 2,000 N·m).

In example system 700, as with system 600, a target gap 740 and a current gap 750 are compared. Unlike example system 600, where the difference (c) is augmented by lead vehicle sensor information and rear vehicle sensor information 630 to control and/or command torque, example system 700 receives lead vehicle inputs 770 from various lead vehicle ECUs, then transmits that information to ECUs on a rear vehicle while taking into account at least c and a time offset. For example, an input to rear vehicle engine ECU may equal the output of a lead vehicle engine ECU while augmented by an amount (e.g., current gap—target gap) plus a time offset. In various embodiments, a time offset may be represented by the equation:

$$\text{Time Offset} = \frac{\text{Target Gap}}{\text{Rear Truck Speed}} \times \text{Gain, where Gain} \propto f(\varepsilon) \quad \text{(Equation 1)}$$

Wherein $f(\varepsilon)$ accounts for the error between a target gap and a current gap.

Thus, at platoon ECU 710, c and a time offset may be used to augment data from lead vehicle inputs 770 (e.g., input from the lead vehicle engine ECU 730, input from the lead vehicle retarder ECU 732, and input from the lead vehicle brake ECU 734). This augmented data can then be processed by time offset 760. In other words, data from individual ECUs are augmented by $\varepsilon$, and then used as input for time offset 760 to make up for the difference in time that a rear vehicle takes to get to the location that a lead vehicle was at when the lead vehicle's ECUs provided their respective outputs. Further, it should be appreciated that the calculations involving gap error and time offset do not need to be performed in any particular order, and in some embodiments one or both may not be used.

Put another way, the information from the lead vehicle ECUs may be received as input for the rear vehicle ECUs. For example, input for rear vehicle engine ECU 780 is based at least in part on output from lead vehicle engine ECU 730; input for rear vehicle retarder ECU 782 is based at least in part on output from lead vehicle retarder ECU 732; and input for rear vehicle brake ECU 784 is based at least in part on output from lead vehicle brake ECU 734. Of course, additional or fewer ECUs may be used in the same manner as those shown in system 700, but are not shown due to space constraints.

Therefore, it should be understood that outputs from a lead vehicle's ECUs may be used for multiple purposes. For example, outputs from a lead vehicle's ECUs may be split such that the output signals are: (1) sent to an actuator in the lead vehicle (e.g., an engine ECU to control torque); and (2) sent wirelessly to a rear vehicle to be used as input for its counterpart ECUs (e.g., a rear vehicle's engine ECU to control torque). Of course, in some embodiments various components such as amplifiers, relays, and/or resistors may be placed in between components such as: (1) a lead vehicle ECU and a lead vehicle actuator; and/or (2) a lead vehicle ECU and a lead vehicle transmitter/transceiver. Such components may be used to reduce noise or amplify a signal such that a normal ECU's output signals can be sent to two or more devices.

Figure 8A:
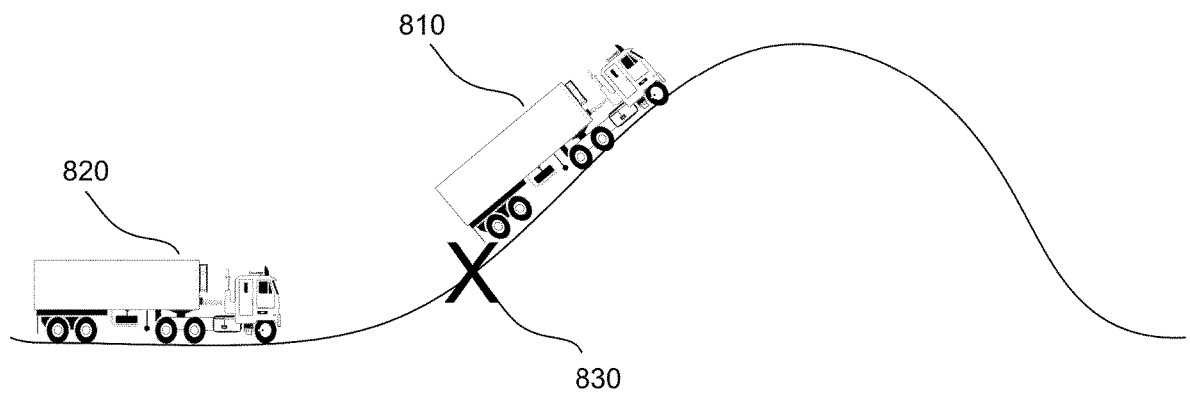
FIG. 8A illustrates two vehicles platooning, in accordance with some embodiments.

Proceeding to FIG. 8A, two example vehicles are shown platooning up a hill. It should be understood that herein, FIGS. 10A, 10B, 11A, 11B, 11C, 12A, 12B, 13A, 13B, 14A, 14B, 15, and 16 also describe how one or more vehicles function when traveling up a hill, among other functions such as shifting gears. Nothing in the description of FIG. 8A or 8B should be construed as limiting the embodiments described in FIGS. 10A-15. Similarly, nothing in the description of FIGS. 10A-15 should be construed as limiting embodiments described with reference to FIGS. 8A and 8B.

In example in FIG. 8A, vehicle 810 is the lead vehicle and has already passed point X 830 on the road. Vehicle 820 is the rear vehicle and has yet to pass point X 830. Often, when a vehicle ascends a hill, it must increase its torque to create the force necessary to reach the top of the hill. In addition, a vehicle may change gears. Thus, in some embodiments engine ECU and transmission ECU data may be required to efficiently/smoothly travel in a platoon. Additional discussion involving maintaining a gap on different types of topography is included with reference to FIGS. 10A-15. It should be noted that here, and throughout the specification, the term torque may refer to: (1) engine gross torque; (2) engine net torque; (3) wheel torque from an engine; and/or (4) wheel torque from braking—all with or without gear shifting information (e.g., from a transmission ECU).

Figure 8B:
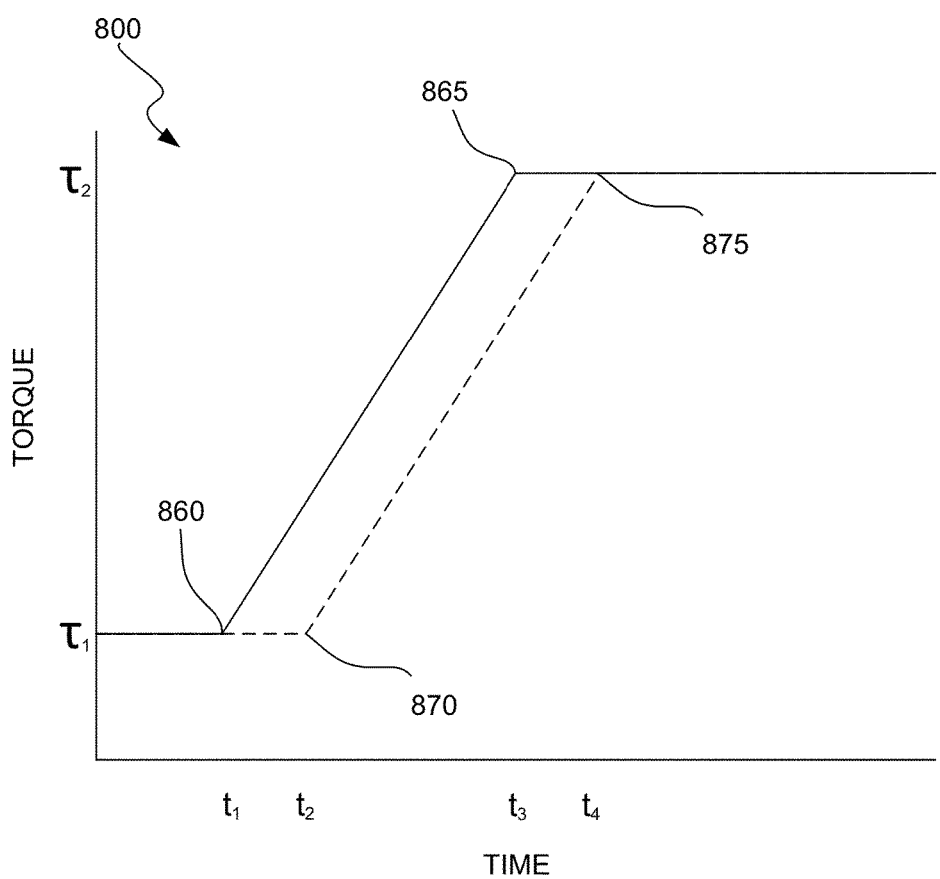
FIG. 8B illustrates a graph representing torque compared to time, in accordance with some embodiments.

FIG. 8B is an example graph 800 that shows the torque ($\tau$) commanded (or controlled) by one or more ECUs in vehicles 810 and 820 over time (t). Graph 800 is intended to illustrate an example platooning situation with respect to FIG. 8A, wherein vehicles 810 and 820 must increase their respective amounts of torque to: (1) reach the top of the hill; and (2) maintain the gap between them.

Accordingly, point 860 on graph 800 indicates a point in time ($t_1$) where vehicle 810 passes point 830 and increases an amount of torque from $\tau_1$ to $\tau_2$ to produce enough force to cause vehicle 810 to make it to the crest of the hill. At time $t_3$, the torque produced by vehicle 810 plateaus at $\tau_2$.

As described above, in some embodiments, information associated with torque (e.g., information representative of an amount of torque or a change in an amount of torque) provided by an ECU is wirelessly transmitted from lead vehicle 810 to rear vehicle 820. Based on information associated with torque provided by an ECU in lead vehicle 810, a time offset may be utilized by a system within vehicle 820 (e.g., PECU 710) such that an ECU in rear vehicle 820 may command (or control) torque in rear vehicle 820 to change from $\tau_1$ to $\tau_2$ when rear vehicle 820 reaches point X 830 at time $t_2$ (e.g., point 870 on graph 800). Correspondingly, based on information provided by an ECU on lead vehicle 810, the amount of torque produced by rear vehicle 820 would be $\tau_2$ at point 875 of graph 800 in this example.

As described above, it should be understood that in some embodiments, information in addition to the output of a lead vehicle's ECU may be used by a platooning system to calculate an input to an ECU that controls torque on a rear vehicle, including, but not limited to: target gap, current gap, lead vehicle speed, rear vehicle speed, lead vehicle weight, and rear vehicle weight. Moreover, since a gap cannot be maintained precisely (e.g., to an exact millimeter), in any of the embodiments described herein a gap tolerance may exist. For example, a system with a gap tolerance may allow a rear vehicle to follow substantially within 0.5 meters, 1.0 meters, 2.0 meters, 3.0 meters, 5.0 meters, etc., and the system may still consider the gap—even though it is not exact down to the millimeter—to be a target gap (this is sometimes referred to as the gap being squishy). Additional gap tolerance information may be found in U.S. patent application Ser. No. 15/605,456, which is hereby incorporated in its entirety.

Figure 9:
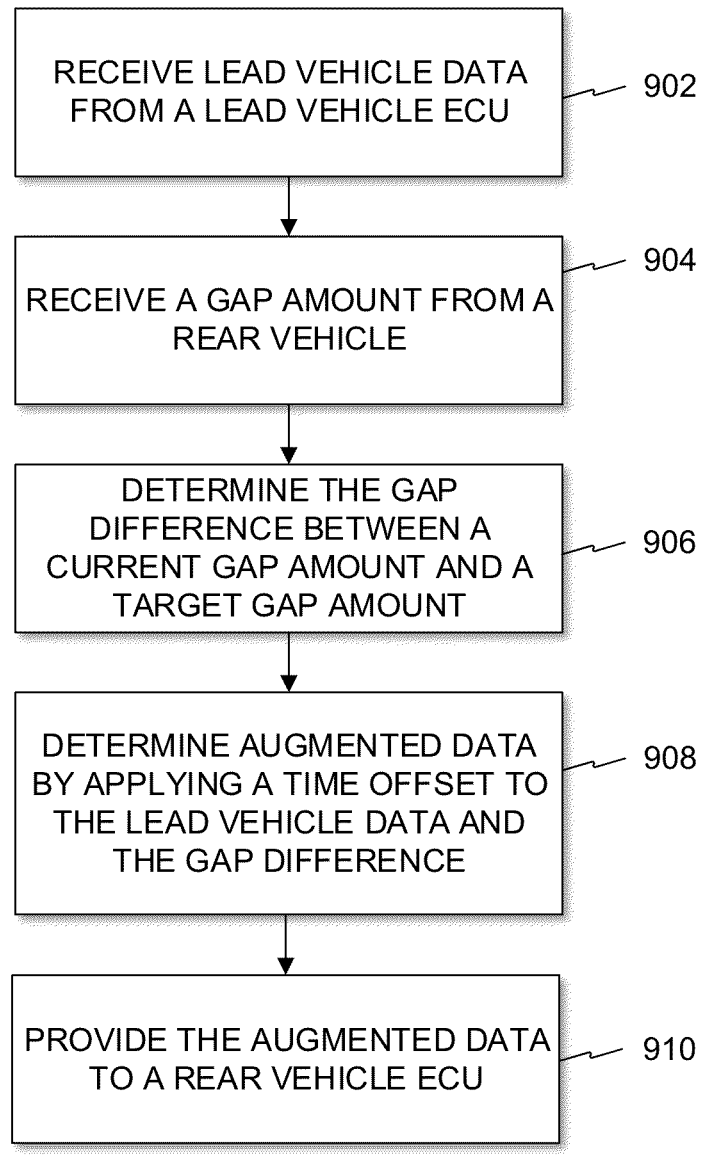
FIG. 9 illustrates a flow chart of an example process, in accordance with some embodiments.

FIG. 9 shows a flowchart 900 of a method for maintaining a relationship between a plurality of vehicles, in accordance with one or more embodiments of the invention. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 8 should not be construed as limiting the scope of the invention. In one or more embodiments, the steps of FIG. 9 can be performed by example systems 100 and/or 200, and/or the example systems shown in FIGS. 3-7.

In step 902, lead vehicle data is received from a lead vehicle ECU. In various embodiments, data from one or more lead vehicle ECUs may be required by one or more rear vehicle ECUs. Data may be transmitted via DSRC from a lead vehicle to a platooning ECU in a rear vehicle, which may perform operations on the data from the lead vehicle ECU data prior to providing that data to a rear vehicle's ECU(s). Lead vehicle data may include, but is not limited to, data associated with a/an: position, latitude, longitude, altitude, heading, speed, longitudinal and lateral acceleration, relative angle, a blowout, type of load (e.g., type of materials a vehicle is carrying), brake status, brake pressure, a relative location of a kingpin (e.g., as close to the cabin as possible or as far from the cabin as possible while staying properly attached), how a load is balanced (e.g., weights associated with one or more axles, and/or an amount of movement of the rear axles relative to the trailer resting above), load balancing, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, interior lighting, exterior lighting, retarder, anti-lock brakes, emergency braking, engine governor, powertrain, gear ratio, wheel size, wheel type, wheel angle, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, forward looking radar, ultrasonic sensors, road surface, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

It should be appreciated that a rear vehicle may provide the aforementioned information to a lead vehicle (e.g., if a lead vehicle requests such information). In some embodiments a rear vehicle may become a lead vehicle (e.g., if the rear vehicle overtakes the lead vehicle, or if a third vehicle joins the platoon behind the rear vehicle). In such embodiments, a rear vehicle may provide any of the information mentioned above (and more) to any other vehicle via DSRC, a NOC, or any other suitable method.

In step 904, a current gap amount is received from a rear vehicle. In some embodiments, a gap may include a distance measured by actual travel over a road (e.g., a distance of a vehicle traveling where the distance includes bends or turns in a road). Such a gap amount may be determined by one or more of: a radar, ultrasonic sensors, LIDAR, a map, beacons (e.g., on a road, vehicle, building), information related to actual travel over a road (e.g., provided by a lead vehicle), or any combination thereof. Again, a gap may be based on a distance and/or an amount of time.

In step 906, a difference between a current gap amount and a target gap amount is determined. A current gap amount may be useful in determining whether two or more vehicles are platooning in an intended manner. For instance, a current gap may be used to determine whether one vehicle is traveling too close or too far from another vehicle. A target gap may be based on a variety of attributes, including, but not limited to, data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

In various embodiments a target gap may be received by a platoon ECU from a NOC. Sometimes, a target gap may be determined by a platoon ECU based on information from a NOC and information from a lead and/or rear vehicle. For example, a gap may be determined by a location (e.g., which may be used to determine a speed limit), a NOC, and attributes of brakes on a front and/or rear vehicle.

In step 908, augmented data is determined by applying (1) a time offset and (2) the difference between a current gap and a target gap to lead vehicle data. As described herein, it may be advantageous if a rear vehicle performs various actions at a later time than a lead vehicle while maintaining a gap (e.g., staying within a threshold (predefined or dynamic) distance/position/gap of space from a target gap). In some embodiments, a target gap may be predefined and provided by a NOC or a software application (which could be connected to a NOC or located in a vehicle). In some embodiments, a target gap may be dynamic and based on various attributes as described above, such as speed, vehicle weight, wind, torque, brake pressure, and/or traffic conditions.

In step 910, augmented data is provided to at least one rear vehicle ECU. Augmented data may be a combination of data received from at least one ECU in a lead vehicle, a difference between a target gap and a current gap, and a time offset. For example, a lead vehicle may be climbing a hill and request more torque as it is climbing. A rear vehicle may have instructions to maintain a gap, but does not need to increase its torque immediately because the lead vehicle is slowing down as it begins traveling uphill. Thus, a rear vehicle may initially brake to maintain a gap, or it may not brake to stay within a minimum gap. Once the rear vehicle begins climbing uphill, it will request additional torque. Of course, the rear vehicle may request additional torque preemptively based on the lead vehicle's request for torque. In this situation, a rear vehicle may not request torque for a moment based on a time offset (e.g., an amount of time for a rear vehicle to reach the location the lead vehicle was at when it requested more torque), sometimes in combination with the gap difference.

In step 912, a rear vehicle is caused to perform an action based on augmented data. For example, a rear vehicle may request more torque and/or change transmission gears at a certain point in time based on augmented data. A rear vehicle may use its retarder at particular times based on augmented data. A rear vehicle may use a certain ratio of foundation brakes to a retarder based on augmented data. A rear vehicle may follow a trajectory based on augmented data. A rear vehicle may speed up or slow down based on augmented data. A rear vehicle may downshift and brake by a particular amount based on augmented data. A rear vehicle may change lanes based on augmented data.

Figure 10A:
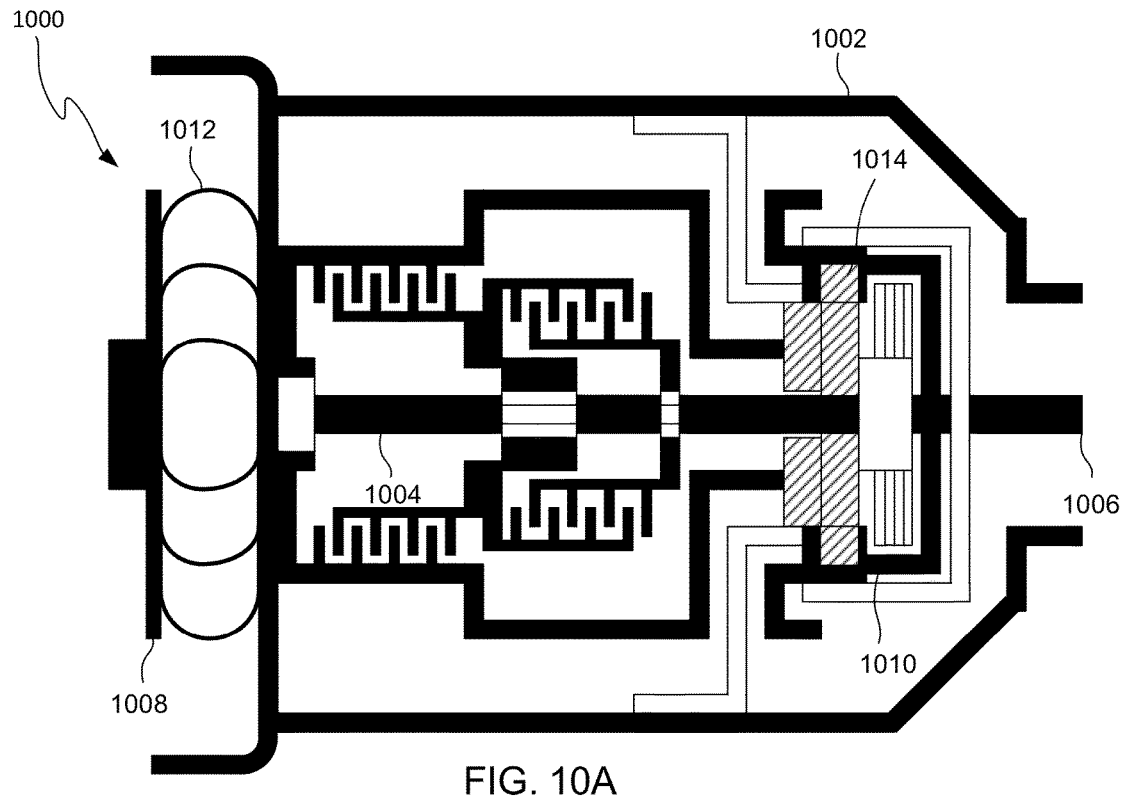
FIG. 10A illustrates an example transmission, in accordance with some embodiments.

FIG. 10 illustrates an example transmission 1000, in accordance with some embodiments. Transmission 1000 may include a transmission case 1002, an input shaft 1004, and an output shaft 1006. In addition, transmission 1000 may be connectively coupled to a flywheel 1008. In some embodiments, transmission 1000 may also include on or more clutches 1010, a torque converter 1012, and one or more planetary gear sets 1014. It should be understood that the example transmission 1000 shown in FIG. 10A is only one of many types of transmissions (e.g., conventional transmissions, continuously variable transmissions (CVTs), dual-clutch transmissions, automated manual transmissions), and thus transmission 1000 should not be meant to limit embodiments described herein in any way.

Moreover, as discussed above, the term shifting may be used broadly within the present disclosure. For example, shifting gears/a gear shift may refer to: choosing/changing to a particular gear, choosing/changing to a gear ratio (whether a fixed ratio or a ratio created using a CVT, or another ratio using a different type of transmission such as a dual-clutch) choosing/changing a speed ratio, and/or downshifting (e.g., changing to a lower gear ratio). Further, in some examples shifting gears may refer to: activating a clutch (e.g., to change to neutral, and/or to control the slip of a torque converter clutch and/or pulsations of a motor), choosing/changing a mode of a torque converter (e.g., released, locked up), determining the next gear meshed in a dual-clutch transmission (e.g., choosing/changing the pre-selection of a gear), etc. Thus, the term shifting may refer to a number of actions performed on/by a transmission and/or transmission ECU.

Of course, one of the goals of shifting gears and commanding/controlling an amount of torque is to maintain a gap between vehicles. Thus, any information regarding the shifting of gears, using differentials (e.g., active differentials), commanding/controlling torque (e.g., wheel torque), controlling speed, sharing map information (e.g., topography), predictive shifting, historical information regarding a roadway, fuel economy, braking (e.g., using foundation brakes, a retarder, and/or an engine brake (the mechanical slowing of the engine in response to shifting gears) may all be transmitted using V2X communications (including vehicle-to-vehicle, vehicle-to-infrastructure, base station, networks, or other types of communication channels).

As discussed throughout this application, generally choosing a gear is a compromise between fuel economy and performance. For example, a vehicle may want to save fuel by choosing a more conservative gear ratio. This is the case for traditional transmissions, CVTs, etc. At a lower gear, fewer RPMs are required to achieve the same speed.

Today, vehicles that are platooning may employ independent shifting strategies. In other words, in today's nascent platooning market, although information regarding throttle, braking, acceleration, and steering may be passed between trucks via a link, information associated with shifting is often not shared between vehicles.

Because platooning vehicles often shift gears independently of one another, a gap may not be maintained as precisely as desired. In some cases, when a front vehicle downshifts a gap may increase so much that a platoon dissolves. Further, when there are three or more vehicles in a platoon, as the gap increases due to a first vehicle downshifting and accelerating, the gap between a second vehicle and a third vehicle may also increase (often more than the gap between the lead vehicle and the second vehicle), and so on. Thus, the problem may be exacerbated when more three or more vehicles are platooning.

Accordingly, a system for platooning including communicating transmission information (e.g., the shifting of gears), is needed in the art.

Figure 10B:
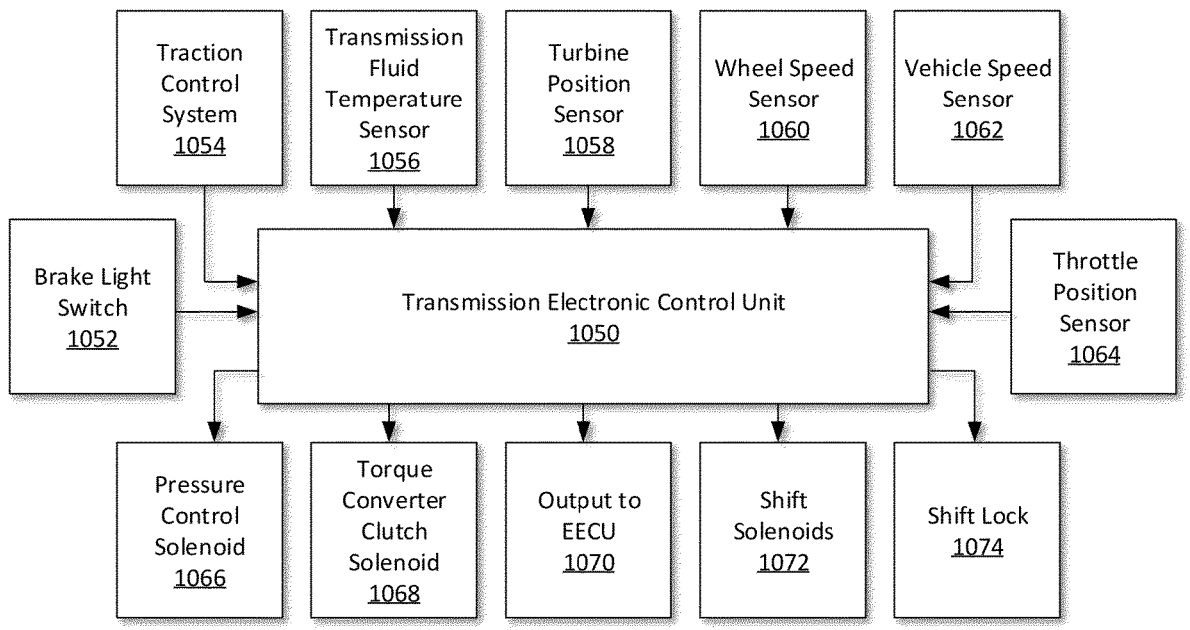
FIG. 10B illustrates an example transmission electronic control unit, in accordance with some embodiments.

FIG. 10B illustrates an example transmission electronic control unit 1050, in accordance with some embodiments. Herein, transmission electronic control unit 1050 may be used interchangeably with the terms TECU 1050, transmission control unit 1050, TCU 1050, or the like. TECU 1050 is also illustrated in FIG. 5 as transmission ECU 520, in accordance with some embodiments.

TECU 1050 may include inputs such as brake light switch 1052, which is used to determine whether to activate the shift lock solenoid to prevent the driver from selecting a driving range with no foot on the brake. In more modern TECUs this input can also be used to determine whether to downshift the transmission to increase engine braking effect if the transmission detects that the vehicle is going downhill.

Another TECU input may be a traction control system (TCS) 1054. Many TECUs now have an input from a vehicle's traction control system. If TCS 1054 detects unfavorable road conditions, a signal may be sent to TECU 1050. TECU 1050 can modify shift programs by upshifting early, eliminating the torque converter lock-up clutch application, and also eliminating the first gear totally and accelerating from a stop in second gear.

TECU 1050 may also include an input from a transmission fluid and temperature sensor 1056. In some embodiments, transmission fluid and temperature sensor 1056 may also be referred to as a transmission oil temperature sensor. This sensor may determine the fluid temperature inside the transmission. This can be used for diagnostic purposes to determine whether automatic transmission fluid (ATF) is at the correct temperature. The main use of this sensor has been as a failsafe feature to downshift the transmission if the ATF becomes extremely hot. In some embodiments, information may be transmitted between vehicles indicating a reason for a downshift, such as this failsafe feature. On more modern transmissions this input may allow the TECU to modify the line pressure and solenoid pressures according to the changing viscosity of the fluid based on temperature in order to improve shift comfort, and also to determine regulation of the torque converter lock-up clutch.

TECU 1050 may also include an input from turbine position sensor 1058. Turbine position sensor 1058, also known as a turbine speed sensor or input speed sensor, may send a varying frequency signal to TECU 1050 to determine a current rotational speed of the input shaft or torque converter. TECU 1050 can use the input shaft speed to determine slippage across the torque converter and potentially to determine the rate of slippage across the bands and clutches. This information can be used to regulate the application of the torque converter lock-up clutch smoothly and effectively. As with other inputs to a TECU, this information ray be shared between vehicles via a communication link.

TECU 1050 may also include an input from wheel speed sensor 1060. Modern automatic transmissions may have wheel speed sensor 1060 input to determine the true speed of the vehicle to determine whether the vehicle is going downhill (e.g., operating on a downgrade) or uphill (e.g., operating on an upgrade) and also adapt gear changes according to road speeds, and also whether to decouple the torque converter at a standstill to improve fuel consumption and reduce load on a running gear. In some embodiments, a gear ratio may be selected by a system (or user) to achieve a certain amount of wheel speed (or wheel torque). In some embodiments wheel torque and/or wheel speed may be communicated between vehicles and a rear vehicle may attempt to match the wheel torque and/or wheel speed of a front vehicle.

TECU 1050 can also include an input from vehicle speed sensor (VSS) 1062. VSS 1062 may send a varying frequency signal to TECU 1050 to determine a current speed of a vehicle. TECU 1050 can use this information to determine when a gear shift should take place based on various operating parameters. TECU 1050 may also use a ratio between turbine location/speed sensor 1058 and wheel speed sensor 1060 to determine when to change gears. If either turbine location/speed sensor 1058 and wheel speed sensor 1060 fails or malfunctions becomes faulty, the ratio will be wrong which in return can cause problems like false speedometer readings and transmission slipping. Again, vehicle speed can be communicated between vehicles, including information regarding malfunctions.

TECU 1050 may also include an input from throttle position sensor (TPS) 1064. TPS 1064 along with vehicle speed sensor 1062 may be the two main inputs for most TECUs. Older transmissions use this to determine engine load, and with the introduction of drive-by-wire technology, this is often a shared input between an EECU and TECU. The input can be used to determine the optimum time and characteristics for a gear shift according to a load on an engine. A rate of change may be used to determine whether a downshift is appropriate for overtaking, for example, the value of TPS 1064 can also be continually monitored during a trip and shift programs may be changed accordingly (economy, sport mode, etc.), and may be shared with a platooning system for better performance. TECU 1064 can also reference this information with vehicle speed sensor 1062 to determine vehicle acceleration and compare this with a nominal value; if the actual value is much higher or lower (such as driving uphill or towing a trailer) the transmission will change its gearshift patterns to suit the situation.

In addition to the inputs discussed herein, TECU 1050 may provide outputs to various components. For example, TECU 1050 may send a signal to shift lock 1074, which causes automatic transmissions to lock the selector lever via a shift lock solenoid to stop a driving range being selected if the brake pedal is not depressed. Similarly, shift solenoids 1072 may receive information from TECU 1050 and be activated to change gears. Simple electronic-control designs (such as Ford's AOD-E™, AXOD-E™ and E4OD™) use the shift solenoids 1072 to modify the shift points in an existing valve body, while more advanced designs (such as the Chrysler Ultradrive™ and its follow-ons) use shift solenoids 1070 to control the clutches indirectly; by way of a greatly simplified valve body. In some embodiments, transmission inputs may be received from a measured incline (e.g.; an amount of incline and/or decline may be measured by a inclinometer, estimated by a GPS, and/or derived from a map and transmitted to a. TECU or other device). As with other inputs, such information may be used to determine when to shift gears, what gear to shift to/from, and/or where to shift gears (e.g., at what point on an incline and/or decline).

TECU 1050 may also provide output signals to pressure control solenoid 1066. Modern electronic automatic transmissions may still be fundamentally hydraulic. This may require precise pressure control. Older automatic transmission designs may only use a single line pressure control solenoid 1066 which modifies pressure across an entire transmission. Newer automatic transmission designs may use many pressure control solenoids 1066, and sometimes allow the shift solenoids 1072 themselves to provide precise pressure control during shifts by ramping the solenoid on and off. The shift pressure may affect the shift quality (too high a pressure will result in rough shifting; too low a pressure will cause the clutches to overheat) and shift speed.

TECU 1050 may also provide output signals to torque converter clutch (TCC) solenoid 1068. Many electronic automatic transmissions utilize TCC solenoid 1068 to regulate a torque converter electronically. Once fully locked, the torque converter may no longer apply torque multiplication and may spin at the same speed as the engine. This can provide a major increase in fuel economy. Modern designs provide partial lockup in lower gears to improve fuel economy further, but this can increase wear on the clutch components.

TECU 1050 may include output to EECU 1070 (also shown as Engine ECU 512 in FIG. 5). TECU 1050 may provide an output to an EECU to retard the ignition timing, or reduce the fuel quantity, for a few milliseconds to reduce load on the transmission during heavy throttle. This allows automatic transmissions to shift smoothly even on engines with large amounts of torque which would otherwise result in a harder shift and possible damage to the gearbox.

It should be understood that this list of inputs and outputs to and from TECU 1050 is not meant to be limiting. In fact, TECU 1050 may include more, or fewer inputs, and more, or fewer outputs. Thus, embodiments described elsewhere in this application may describe other TECU inputs and outputs not described in FIG. 10B. Moreover, it should be understood that any inputs and/or outputs to and/or from a TECU may be transmitted (e.g., via V2V) to another vehicle's PECU, VECU, EECU, TECU, BECU, etc. In some embodiments, it is contemplated that information created in a TECU may be sent to another vehicle's ECUs. For example, TECU 1050 may receive a turbine speed and a wheel speed and may determine a ratio of the two speeds to determine whether/when to shift gears. In some embodiments, TECU 1050 may send turbine speed, wheel speed, and/or the ratio and/or the determination whether/when to shift gears, or other information determined by TECU 1050. In other words, TECU 1050 may transmit information it calculates based on its inputs to another vehicle.

In some embodiments, TECU 1050 in a rear vehicle may want to receive transmission and gear ratio information from a front vehicle so that it may configure its gear ratio and other characteristics to match the front vehicle. It should be appreciated that in trucks, automated manuals tend to have a clutch similar to one in a manual transmission, and may only be used for starting and stopping. The rest of the time, in a truck, shifting gears may occur without using a clutch. Thus, trucks may measure speeds of their input and output transmission shafts very precisely. When the speeds are close, these transmissions may engage sliding clutches inside the transmission to engage (e.g., shift) gears. Often, this is performed using actuators that are activated pneumatically. Often, truckers may "float" the gears (e.g., shift the gears by timing RPMs without using a clutch). Automatic transmissions are more precise, so they may do this without damaging portions of a transmission. Further, automatic transmission may also skip gears (e.g., shift from a first gear to a second gear which is more than one gear away (e.g., $3^{rd}$ to $5^{th}$)) with more precision than an operator skipping gears manually.

It should be appreciated that in some embodiments, a driver may shift gears on their own. For example, in response to a front vehicle shifting gears, a notification may be provided to a user of a rear truck indicating that they should change gears. Such a notification may be provided via audio (e.g., voice), or video (e.g., on a graphical user interface).

FIGS. 11A, 11B, and 11C illustrate vehicles 1110 and 1120 travelling on flat terrain, in accordance with some embodiments. FIG. 11A illustrates two vehicles 1110 and 1120 platooning with a gap of ten meters. Ideally, in some embodiments, when vehicle 1110 accelerates, vehicle 1120 will also accelerate and maintain a ten-meter gap. (Of course, the gap may be any distance or time headway). In most systems today, when front vehicle 1110 accelerates rear vehicle 1120 may attempt to maintain a gap by increasing an amount of torque and/or throttle. However, if front vehicle 1110 downshifts to a lower gear ratio and increases its RPMs, rear vehicle 1120 may not be able to maintain a gap—particularly if rear vehicle 1120 does not change gears. Such an example can be seen in FIG. 11B. In some embodiments, when front vehicle 1110 downshifts and accelerates it may cause a gap to grow to an amount where the platoon dissolves. Thus, in some embodiments, a platooning system may cause a rear vehicle 1120 to err on the side of performance and downshift to maintain a gap rather than staying in a higher gear.

In some embodiments, a NOC may monitor a gap between vehicles. The vehicles may transmit and/or receive information associated with a gap and/or shifting gears. In some embodiments a NOC may monitor whether the shifting of gears on one or more vehicles is working (e.g., causing a gap to be maintained). If the gap is not being maintained, the NOC may transmit information causing the vehicles to shift gears in a different manner/time/location/relative time/relative location such that a gap is maintained. In some embodiments, a NOC may cause one or more vehicles to use predictive cruise control or a similar system.

In some embodiments, a vehicle can't downshift because its RPMs are too high. For example, at 1,700 RPMs a transmission may not allow for a downshift. Class 8 tractors, for instance, have useful RPMs in the range of 1,100 to 1,800. Ideally, a traveling vehicle 1110 may generally maintain a lower amount of RPMs with a higher gear ratio to save fuel. When accelerating, vehicle 1110 may downshift into to a lower gear ratio, increase its RPMs, and accelerate. In various embodiments this information may be sent to rear vehicle 1120, and it can do something similar to maintain a gap, as shown in FIG. 11C. Additional discussion of RPMs may be found below with reference to FIG. 14.

Further, although not shown in FIGS. 11A and 11B, a vehicle may shift gears to assist with draw-ins (e.g., where a rear vehicle draws closer to a front vehicle to platoon). For example, if a front vehicle communicates information to a rear vehicle (e.g., speed, gear ratio, acceleration) the rear vehicle may perform an operation (e.g., downshift) based on that information to create a better draw-in experience. In some cases, information sent from a front vehicle may indicate that the front vehicle is slowing down, in which case the rear truck may not downshift while drawing in.

Figure 12A:
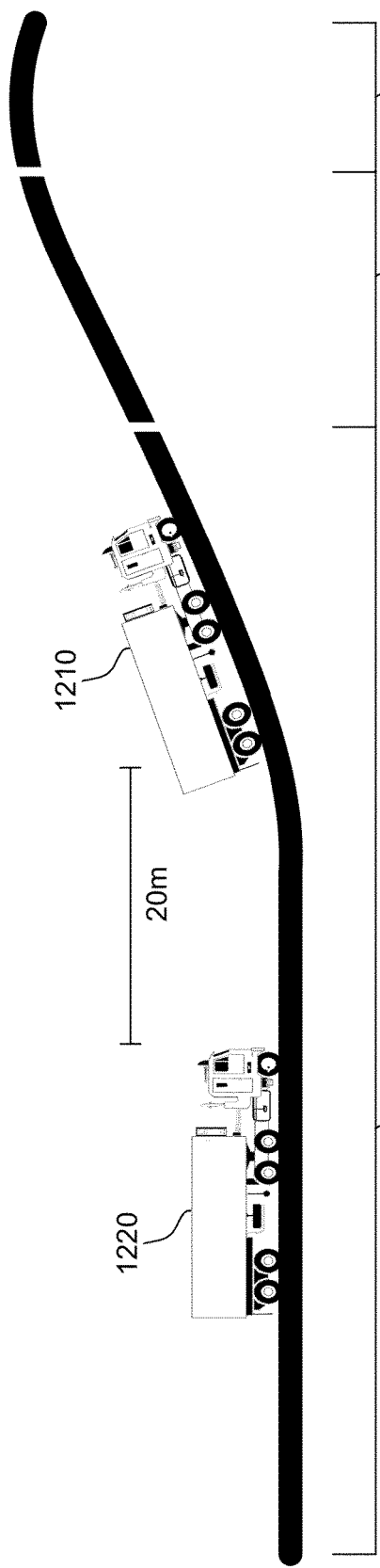
FIGS. 12A-12B illustrate vehicles travelling on an uphill grade, in accordance with some embodiments.
Figure 12B:
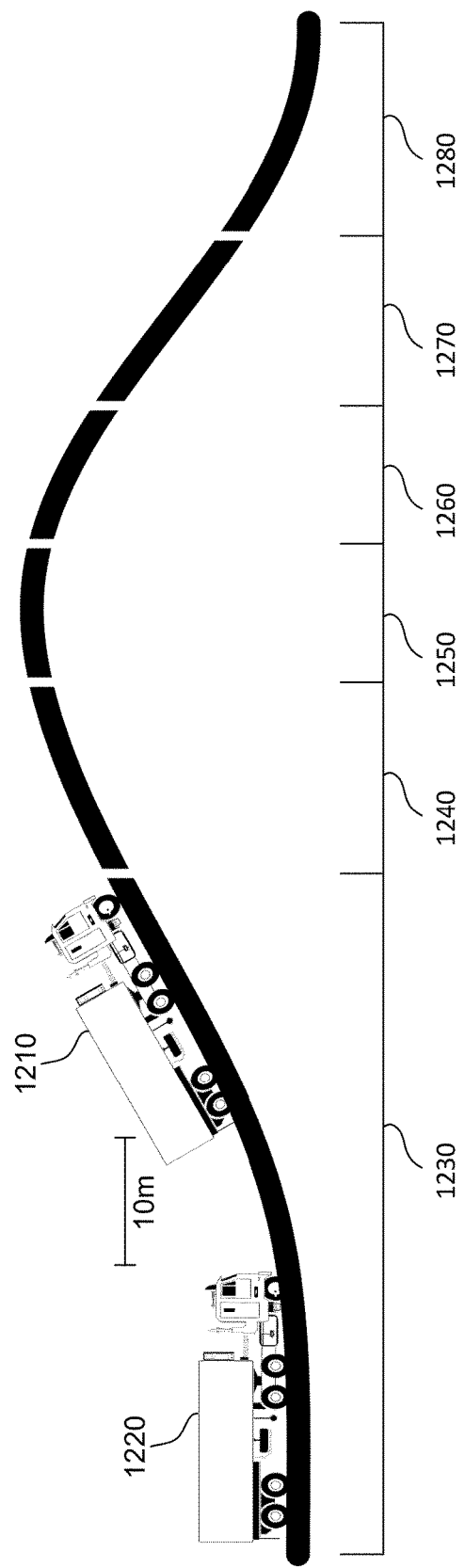

FIGS. 12A-12B illustrate vehicles 1210 and 1220 travelling on an uphill grade, in accordance with some embodiments. Often, vehicles traveling uphill may need to downshift while traveling up the hill to command more power. Like the problems described with reference to FIGS. 11A-11C, when front vehicle 1210 downshifts the gap between it and vehicle 1210 may increase, as shown in FIG. 12A. Further, the more vehicles there are in a platoon (e.g., 3+), the worse the problem becomes since the downshifting, or absence thereof by the second vehicle could cause the gap between the second vehicle and the third vehicle to be greater than a target gap. Accordingly, as each gap grows between trucks, a platoon of trucks which may have been 100 meters long may become 140 meters long or more.

Thus, it would be advantageous if vehicle 1220 were able to maintain a gap as shown in FIG. 12B. Like FIGS. 11A-11C, in some embodiments rear vehicle 1220 may downshift based on information received from front vehicle 1210 associated with downshifting. As described with reference to FIGS. 8A and 8B, a gap may be maintained by: shifting gears, accounting for gap error, accelerating at a particular time (e.g., a length of time that rear vehicle 1220 performs an action that front vehicle 1210 already performed) and/or location (which may also be referred to as a breadcrumb), shifting gears at a particular time and/or location, shifting to a particular gear at a particular time and/or location, commanding/controlling a particular amount of torque at a particular time and/or location, or any combination thereof.

Further, because two vehicles may have different characteristics, data associated with an action performed by front vehicle 1210 may be abstracted before or after sending the data to rear vehicle 1220, then (before or after being received by rear vehicle 1220) the abstracted data may be translated such that rear vehicle 1220 may perform the action performed by front vehicle 1210. For example, a platooning ECU on a front vehicle may receive data associated with an action (e.g., shifting gears) performed by the front vehicle, translate that information into a language that all platooning ECUs can receive, and then send the translated data to platooning ECU on a rear vehicle, which may then translate the information into a language that the particular type of vehicle (the rear vehicle) can use to perform the action as well (e.g., shifting gears).

FIGS. 12A and 12B also show sections of a hill (e.g., a road where vehicles may travel uphill and/or downhill). In some embodiments, the actions of a vehicle may be associated with what section of a hill it's on. For example, while traveling on the first section 1230, a vehicle may accelerate before it reaches a hill to improve its hill climbing capacity (this may include changing gears (e.g., downshifting)). While traveling on the second section 1240, a vehicle may downshift, and/or use the speed it gained while traveling on the first section 1230 to save fuel. At crest 1250 of a hill, a vehicle may continue to slow as it finishes traveling uphill, and/or the reduction in speed may assist a vehicle with not traveling down the hill at an excessive speed. In some embodiments, historical data and/or predictive cruise control may be used to determine when one or more vehicles should shift.

In some embodiments, at section 1260, a vehicle may change to neutral (e.g., where gears are disengaged, where nothing in the gearbox moves, where an engine is at idle and only a portion of the transmission is moving, where pressing on the accelerator pedal does not cause the vehicle to accelerate). In some embodiments, shifting a transmission into neutral may also be referred to as neutral coast, Smart Cruise™, Eco-Roll™, Georgia overdrive, etc. In various embodiments, such actions (e.g., traveling at least a portion of a downhill grade while in neutral) may be disabled based on a location of a vehicle (e.g., if a vehicle is in a jurisdiction where putting a vehicle in neutral while traveling downhill is illegal). In section 1270, an engine brake, retarder, foundation brake, or any combination thereof may be used to slow a vehicle as it is traveling downhill. When traveling downhill, a vehicle may downshift, which may cause the retarder and/or engine brake to improve operation. This is because, generally, a retarder and an engine brake operate better when at higher RPMs.

Moreover, generally a retarder will work better in diesel engines because there are few pumping losses in a diesel vehicle, while in a gasoline vehicle more braking power may be achieved from an engine brake because there is a vacuum in a throttle body. Thus, in some embodiments, an engine brake or a retarder may be used based on whether a vehicle has a diesel or a gasoline engine. At section 1280 (e.g., where a downhill grade decreases), a vehicle may return to a neutral state and increase its speed while saving fuel by not using an engine brake and/or being in neutral. In various embodiments a front vehicle 1210 may send information to one or more rear vehicles 1220 indicating that it is in neutral.

In one example, when a platoon is descending, at least a rear truck may maximize retarder performance by downshifting since exhaust and compression brake output is RPM-dependent. A system may recognize a downhill section (e.g., using an inclinometer), determine that retarder performance is insufficient, and based on that determination, downshift to increase braking force and reduce or eliminate reliance on foundation brakes.

As discussed above, it is possible that rear vehicle 1220 also switches to a neutral in response to front vehicle 1210 switching to neutral, leading to undesirable consequences. For example, if front vehicle 1210 is in neutral and rear vehicle 1220 is not in neutral but attempts to match an amount of engine torque of front vehicle 1210, a gap between the two vehicles may become undesirable, and may cause the platoon to dissolve. To solve this, in some embodiments, when front vehicle 1210 is commanding little to zero torque, rear vehicle 1220 may receive information regarding the speed of front vehicle 1210 via radar, LIDAR, V2V transmission, etc.

In some embodiments, a gap threshold may be relaxed (e.g., allowed to grow or shrink without dissolving a platoon), such that the vehicles do not collide with each other and/or conserve fuel. For example, a rear vehicle may allow a gap to grow as a front vehicle crests a hill, and then reduce the gap (e.g., "catch up") as the rear vehicle descends the hill toward the front vehicle. This way, the rear vehicle may not need to use its braking systems and can conserve fuel rather than use its retarder (typically causing the RPMs to increase) or foundation brakes when it doesn't need to.

It should be appreciated that techniques described herein to platoon uphill and/or downhill may be combined, and additional and/or fewer techniques may be used. In particular, in various embodiments vehicles that are different makes or models, are carrying different loads, or have other dissimilar attributes as mentioned herein (e.g., brakes, transmissions) may employ different techniques to achieve a target method of traveling uphill and/or downhill. For example, a front vehicle with a much heavier load may shift into a low gear such that it is producing high RPMs, and rely heavily on a retarder to slow while traveling downhill, while a rear vehicle with a lighter load may not shift into neutral (and thus use engine braking) and rely more on foundation brakes than the front vehicle. Also, as discussed above, because vehicles may be different makes and models, information about one vehicle may be abstracted to a common language (e.g., at a PECU, in the cloud) and translated back (e.g., at a PECU, in the cloud) to a language that another vehicle can use (e.g., machine code/language).

Figures 13A, 13B:
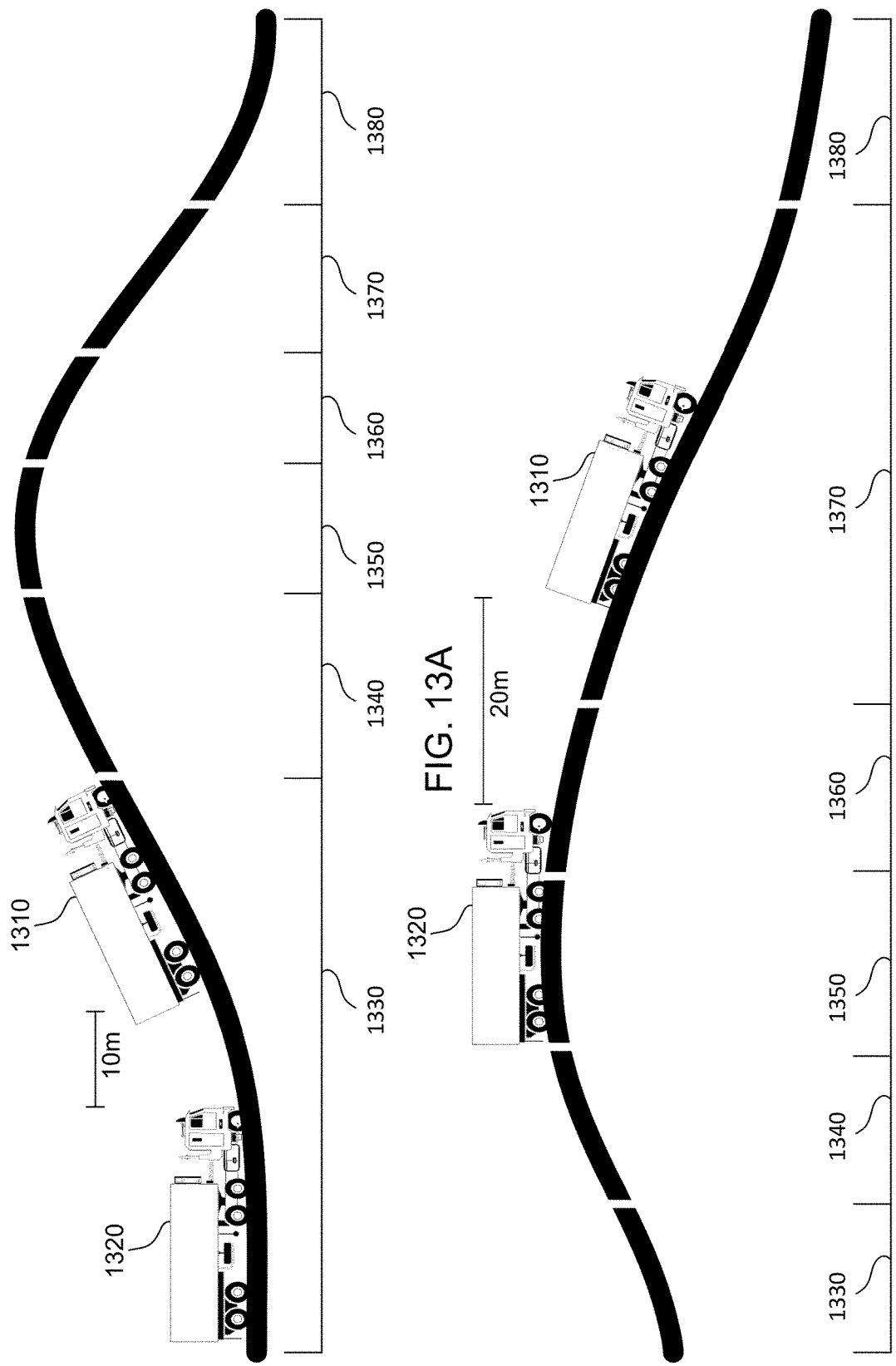
FIGS. 13A-13B illustrate vehicles traveling over a crest and a downhill grade, in accordance with some embodiments.

FIGS. 13A and 13B illustrate vehicles 1310 and 1320 traveling over a crest and onto a downhill grade, in accordance with some embodiments. Similar to FIGS. 12A and 12B, FIGS. 13A and 13B also show sections of a hill 1330, 1340, 1350, 1360, 1370, and 1380. Generally, these sections are the same as in FIGS. 12A and 12B, and may indicate portions of a hill where vehicles 1310 and/or 1320 may perform various actions.

In some embodiments, as front vehicle 1310 travels over a crest of a hill and travels downhill it may: shift into neutral, use its engine brake, use a retarder, use its foundation brakes, or any combination thereof. For example, when front vehicle 1310 begins to travel downhill it may begin in neutral (e.g., while traveling in or across fourth section 1360). Next, it may shift into a low or high gear—which may be based on a grade of the downhill slope—and apply foundation brakes, an engine brake, and/or a retarder (e.g., while traveling across fifth section 1370). Third, front vehicle 1310 may shift back to neutral when it nears the end of a downhill grade (e.g., sixth section 1380).

In response to front vehicle 1310 performing any of the actions mentioned above/herein, rear vehicle 1320 may perform various actions to maintain a gap and/or conserve fuel. For example, rear vehicle 1320 may perform the same actions as front vehicle 1310 does/did (e.g., at the same location and/or time front vehicle 1310 does/did). In some embodiments, rear vehicle 1320 may perform more, or fewer actions than front vehicle 1310 performed while traveling up and/or down a hill. For example, rear vehicle 1320 may not shift into neutral when it begins to travel downhill (e.g., in fourth section 1360) while front vehicle 1310 did. Instead, rear vehicle 1320 may use engine brakes, foundation brakes, and/or a retarder to prevent itself from colliding with front vehicle 1310. In some embodiments, rear vehicle 1320 may attempt to shift and/or reach a target amount of RPMs such that its retarder operates in a particular fashion (e.g., a vehicle may have a target amount of RPMs such that its retarder operates as desired).

In some embodiments, the time and/or location when and/or where a rear and/or front vehicle shifts gears (in relation to one another or independently) when traveling on a substantially flat road, uphill, or downhill may be determined using machine learning (e.g., deep learning). For example, a machine learning algorithm may be used to determine when and/or where a vehicle should shift gears to maintain a gap and/or conserve fuel. In some embodiments, a machine learning algorithm may comprise a neural network (deep or shallow, which may employ a residual learning framework) and be applied instead of, or in conjunction with another algorithm described herein to solve a problem (e.g., determining an optimal time to shift gears while platooning), reduce error, and increase computational efficiency. Such learning algorithms may implement a feedforward neural network (e.g., a convolutional neural network) and/or a recurrent neural network, with supervised learning, unsupervised learning, and/or reinforcement learning. In some embodiments, backpropagation may be implemented (e.g., by implementing a supervised long short-term memory recurrent neural network, or a max-pooling convolutional neural network which may run on a graphics processing unit). Moreover, in some embodiments, unsupervised learning methods may be used to improve supervised learning methods. Moreover still, in some embodiments, resources such as energy and time may be saved by including spiking neurons in a neural network (e.g., neurons in a neural network that do not fire at each propagation cycle).

Figure 14:
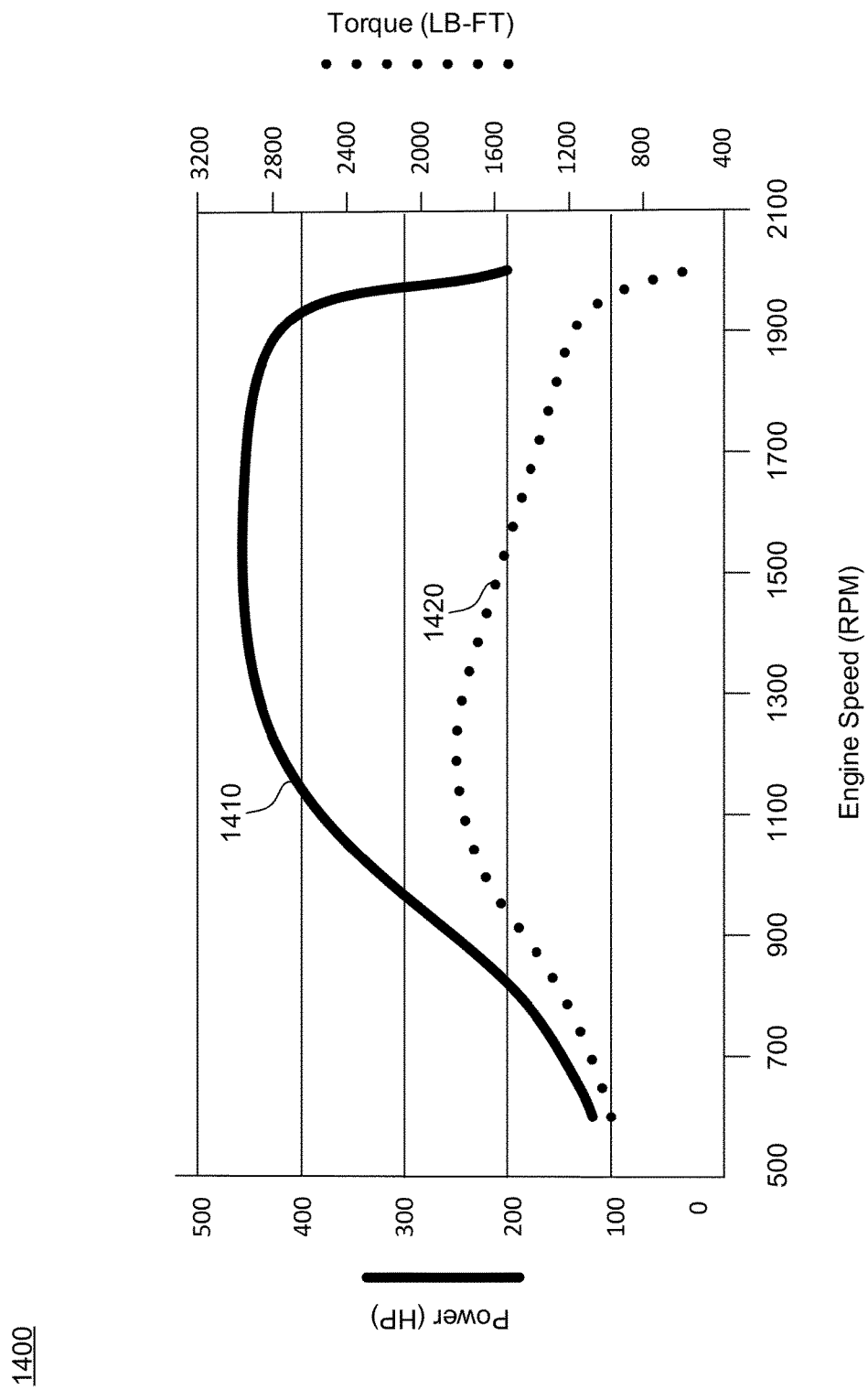
FIG. 14 illustrates example power and torque curves, in accordance with some embodiments.

FIG. 14 illustrates an example graph 1400 with a power curve 1410 and a torque curve 1420, in accordance with some embodiments. Various embodiments regarding shifting gears and amounts of RPMs discussed above may also be discussed with regard to graph 1400. For instance, Class 8 trucks often idle anywhere from 600 RPMs to 700 RPMs (although they may idle above or below such a range). In a situation where a front vehicle or a second vehicle shifts to neutral it may reduce its RPMs to a level in this range. In some embodiments, a vehicle may increase its RPMs to 1700-2100 RPMs (e.g., "higher RPMs" as opposed to 1200 RPMs (or "lower RPMs")) when traveling downhill such that its retarder is more efficient. Moreover, in some embodiments, when a front vehicle is traveling towards a hill it may speed up in a higher gear and shift to a lower gear while climbing a hill such that its engine may spin at 1800-2000

RPMs. When the rear vehicle reaches the same location, or even before it reaches that location (which may be required to maintain a gap), the rear vehicle may also downshift causing its engine to spin at 1800-2100 RPMs.

In some embodiments vehicles may determine when to perform certain actions based on vehicle attributes and/or road attributes. For example, a vehicle may use predictive cruise control (e.g., which may use terrain/topography mapping, GNSS, HD maps, cameras, radar, LIDAR) to manage engine and transmission operations (e.g., manipulate its power train) for efficient operation when traveling uphill and downhill. A vehicle (e.g., a front vehicle) may look ahead for a hill crest and curb its speed, and in some cases may transmit information associated with looking ahead and/or curbing its speed to a rear vehicle. Next, a predictive cruise control system may cause a front vehicle to roll in neutral, and in some cases this information can be transmitted to a rear vehicle (e.g., the location and/or time where/when the front vehicle shifted into neutral). After, a front vehicle may avoid over speeding by using an engine brake, retarder, and/or foundation brakes, and may transmit this information to a rear vehicle. Then, in some embodiments, a front vehicle may build up speed as the downgrade becomes less, and it may send this information to a rear vehicle.

A rear vehicle may perform a variety of operations to maintain a gap while a front vehicle is traveling over a hill, and/or when a front vehicle is using predictive cruise control. For example, a rear vehicle may: use its own predictive cruise control to maintain a gap, determine when to shift gears based on receiving information about operations the front vehicle is performing caused at least in part by the front vehicle's predictive cruise control system, increase and/or decrease a commanded amount of engine torque based on information received about operations the front vehicle is performing caused at least in part by the front vehicle's predictive cruise control system, etc. In various embodiments described herein, predictive cruise control or similar systems may include transmitting and/or receiving data to/from a NOC, such as location information and/or terrain information.

In some embodiments, it is contemplated that a rear vehicle may utilize a system similar to predictive cruise control that is designed for platooning vehicles. In other words, in some embodiments a front and/or at least one rear vehicle may employ a system that manipulates a powertrain based at least in part on a map and a location (e.g., as determined by GPS/GNSS) to maintain a gap. In such a system, front and rear vehicles' systems (e.g., EECU, TECU, PECU, engine, torque, gear ratio, braking systems) may perform actions based on a front and/or rear vehicle's location and attributes of a road the vehicles are traveling on. For example, a front vehicle may determine when/where to change gears based on information received/determined from such a system, while a rear vehicle may determine when/where to change gears based on information received/determined from such a system (e.g., maps and location, which may be transmitted and/or received from a NOC), wherein the rear vehicle may change gears at a different location than a front vehicle. Further, such a system may cause one or more vehicles to refrain from changing gears based on determinations made by the system in order to maintain a gap. As described herein, it should be understood that maintaining a gap may include maintaining a range of distance (e.g., 9-11 meters) or a time headway (e.g., 0.5-0.75 seconds, 0.75-1.0 seconds, 1.5-2.5 seconds).

As another example, a predictive cruise control system designed for platooning vehicles may cause a front vehicle and/or a rear vehicle to: travel at a particular speed, accelerate at a particular time, shift gears (e.g., downshift, shift to neutral) at a particular time and/or location, etc. Such operations may be performed based on a first vehicle's location and/or speed (e.g., a front or rear vehicle's location and/or speed) in relation to a second vehicle (e.g., a front or rear vehicle's location and/or speed). Such operations may also be based upon a desired gap, a current gap, etc. This system may also receive information about attributes of a vehicle to perform optimally. Such attributes may include, but are not limited to a/an: position, latitude, longitude, altitude, heading, speed, longitudinal and lateral acceleration, relative angle, type of load (e.g., type of materials a vehicle is carrying), position in a platoon, brake status, brake pressure, path history, path projection, travel plans, vehicle size, vehicle type, brake type, current operating mode (at least partially autonomous or manual), map data, traffic information, GPS augmentation information (e.g., delays from infrastructure), wheel speed, wheel torque, gross torque, net torque, amount of wind it is traveling in, amount of rain it is traveling in, amount of liquid on a road it is traveling on, infotainment system, suspension, axle weight(s), transmission status, battery, electronic throttle control, throttle pedal, brake pedal, power steering, adaptive cruise control, a blowout, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, tire pressure, cabin temperature, engine temperature, trailer interior temperature, camera, etc.

Figure 15:
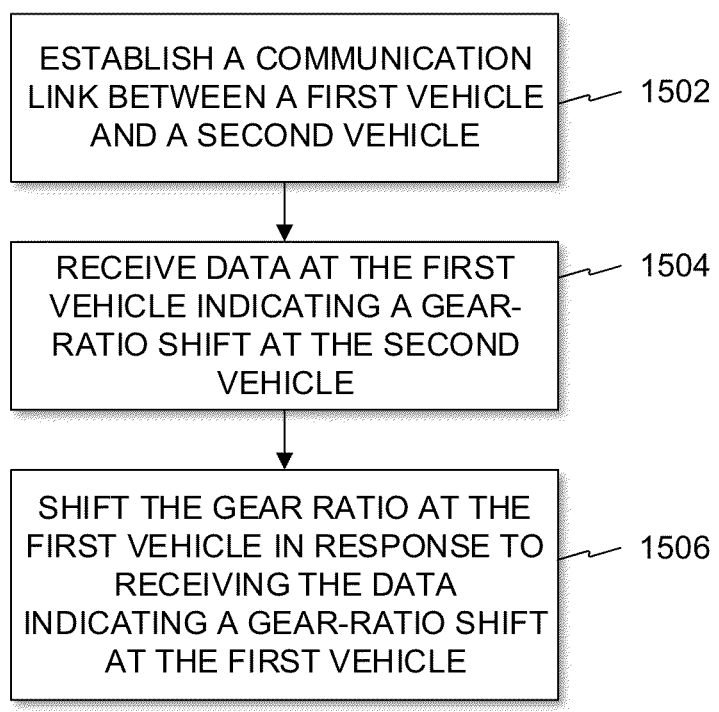
FIG. 15 illustrates a flow chart of an example process, in accordance with some embodiments.

FIG. 15 illustrates a flow chart of an example process, in accordance with some embodiments. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 8 should not be construed as limiting the scope of the invention. In one or more embodiments, the steps of FIG. 9 can be performed by example systems 100, 200, 300, and/or 1600.

At step 1502, a communication link is established between a first vehicle and a second vehicle. This communication link may be established at any point in time (e.g., before vehicles start platooning, before vehicles are even within eyesight of each other). This link may allow vehicles to transfer information such as an number of RPMs an engine is spinning at, a gear ratio a vehicle is in, a gear ratio a vehicle is changing to, a gear ratio a vehicle was at before changing gears, etc. Additional vehicle attributes discussed above may also be transmitted between two or more vehicles.

At step 1504, data is received at the first vehicle indicating a gear-ratio shift at the second vehicle. This gear-ratio shift may include a downshift, an upshift, changing gears into neutral, etc. In other words, the term gear-ratio shift is broad and meant to encompass any operation where a gear ratio changes. In some embodiments, a change in a gear ratio of an active differential may be considered to be a gear-ratio shift.

At step 1506, the gear ratio at the first vehicle is shifted in response to receiving the data indicating a gear-ratio shift at the first vehicle. For example, a first (e.g., rear) vehicle may shift gears based on the second (e.g., front) vehicle shifting gears. The second vehicle may shift from one gear ratio to another gear ratio which are identical to the front vehicle, or the second vehicle may shift from a first gear ratio to another gear ratio wherein the gear ratios do not match the second vehicle's. Further, each vehicle may shift gears at a same location, or they may shift gears at a different location (this may be based on a speed, a type of vehicle, etc.).

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

Figure 16:
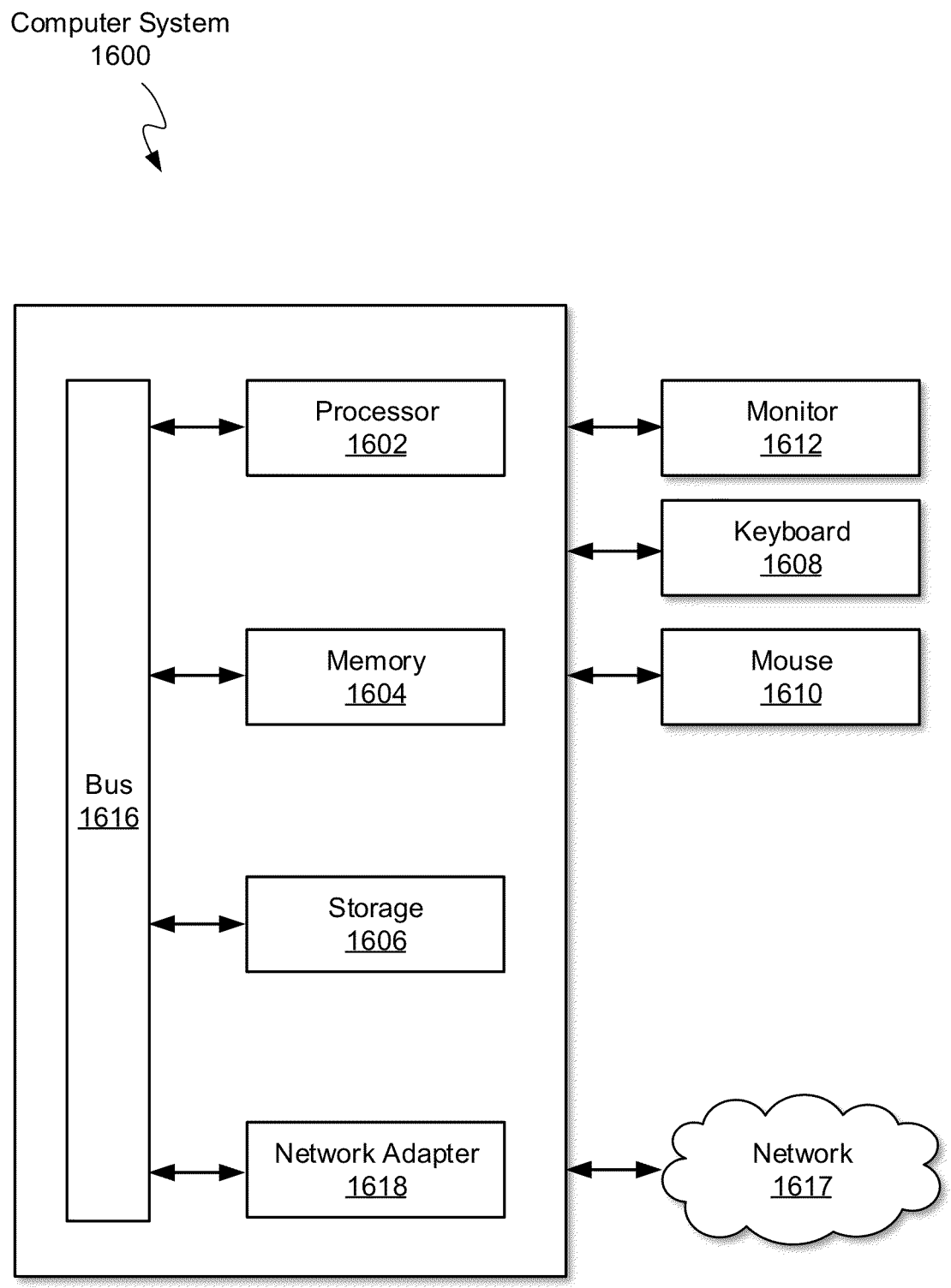
FIG. 16 illustrates an example computer system, in accordance with some embodiments.

For example, as shown in FIG. 16, example computing system 1600 may include one or more computer processor(s) 1602, associated memory 1604 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 1606 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 1602 may be an integrated circuit for processing instructions. For example, the computer processor(s) may be one or more cores or micro-cores of a processor. The computing system 1600 may also include one or more input device(s) 1610, such as a touchscreen, keyboard, mouse, microphone, touchpad, electronic pen, or any other type of input device. Further, the computing system 1600 may include one or more output device(s) 1608, such as a screen (e.g., a liquid crystal display (LCD), a plasma display, touchscreen, cathode ray tube (CRT) monitor, projector, or other display device), a printer, external storage, or any other output device. The computing system 1600 may be connected to a network 1614 (e.g., a local area network (LAN), a wide area network (WAN) such as the Internet, mobile network, or any other type of network) via a network interface connection 1618. The input and output device(s) may be locally or remotely connected (e.g., via the network 1612) to the computer processor(s) 1602, memory 1604, and storage device(s) 1606.

One or more elements of the aforementioned computing system 1600 may be located at a remote location and connected to the other elements over a network 1614. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A vehicle system for use on a rear vehicle when the rear vehicle is behind a lead vehicle in a platoon, the vehicle system on the rear vehicle comprising:
 a receiver, on the rear vehicle, configured to receive data generated by sensors on the lead vehicle;
 a controller, on the rear vehicle, configured to command torque at the rear vehicle based at least in part by the data received from the lead vehicle; and
 at least two CAN busses connectively coupled to the controller wherein certain data is sent on one of the at least two CAN busses based in part on a speed of transmission of all data sent on a different one of the at least two CAN busses.

2. The vehicle system of claim 1, wherein at least one of the rear vehicle and the lead vehicle is an electric vehicle.

3. The vehicle system of claim 1, wherein at least one of the rear vehicle and the lead vehicle is a hybrid vehicle.

4. The vehicle system of claim 1, wherein the controller configured to command torque at the rear vehicle is also configured to control torque at the rear vehicle.

5. The vehicle system of claim 1, wherein the controller on the rear vehicle employs a time offset such that operations that occur at the lead vehicle occur at a later time at the rear vehicle.

6. The vehicle system of claim 1, wherein the commanded torque at the rear vehicle consists of wheel torque.

7. The vehicle system of claim 1, wherein a portion of the data sent to the receiver is the same as a portion of data sent to a transmission ECU included in the lead vehicle.

8. A method for causing a rear vehicle to follow a lead vehicle in a platoon, the method comprising:
   receiving, at the rear vehicle, data generated by sensors on the lead vehicle;
   commanding, by a controller included in the rear vehicle, torque based at least in part by the data received from the lead vehicle; and
   sending, over at least one of at least two CAN busses connectively coupled to the controller, certain data on the at least one of the at least two CAN busses based in part on a speed of transmission of all data sent on a different one of the at least two CAN busses.

9. The method of claim 8, wherein at least one of the rear vehicle and the lead vehicle is an electric vehicle.

10. The method of claim 8, wherein at least one of the rear vehicle and the lead vehicle is a hybrid vehicle.

11. The method of claim 8, wherein the controller commanding torque at the rear vehicle is also configured to control toque at the rear vehicle.

12. The method of claim 8, wherein the controller commanding torque at the rear vehicle employs a time offset such that operations that occur at the lead vehicle occur at a later time at the rear vehicle.

13. The method of claim 8, wherein the commanded torque at the rear vehicle consists of wheel torque.

14. The method of claim 8, wherein a portion of the data sent to the receiver is the same as a portion of data sent to a transmission ECU included in the lead vehicle.

15. A vehicle system for platooning comprising:
   a receiver on a rear vehicle configured to receive data generated by sensors on a lead vehicle;
   a controller on the rear vehicle configured to command torque at the rear vehicle based on the received data; and
   two CAN busses connectively coupled to the controller wherein certain data is sent on one of the two CAN busses in response to a threshold amount of traffic being sent on the other CAN bus.

16. The vehicle system of claim 15, wherein at least one of the rear vehicle and the lead vehicle is an electric vehicle.

17. The vehicle system of claim 15, wherein at least one of the rear vehicle and the lead vehicle is a hybrid vehicle.

18. The vehicle system of claim 15, wherein the controller on the rear vehicle is also configured to control torque at the rear vehicle.

19. The vehicle system of claim 15, wherein the controller employs a time offset such that operations that occur at the lead vehicle occur at a later time at the rear vehicle.

20. The vehicle system of claim 15, wherein the commanded torque at the rear vehicle consists of wheel torque.

* * * * *